US012662972B2

(12) United States Patent
Touchette et al.

(10) Patent No.: US 12,662,972 B2
(45) Date of Patent: Jun. 23, 2026

(54) APPARATUS AND METHOD FOR PRESSURE REGULATION OF A GASEOUS FLUID

(71) Applicant: Cespira Canada Limited Partnership, Vancouver (CA)

(72) Inventors: Alain Touchette, Vancouver (CA); Kory Zeller, Vancouver (CA)

(73) Assignee: Cespira Canada LP, Vancouver (CA)

(*) Notice: Subject to any disclaimer, the term of this patent is extended or adjusted under 35 U.S.C. 154(b) by 0 days.

(21) Appl. No.: 18/835,003

(22) PCT Filed: Jan. 30, 2023

(86) PCT No.: PCT/CA2023/050124
§ 371 (c)(1),
(2) Date: Jul. 31, 2024

(87) PCT Pub. No.: WO2023/147653
PCT Pub. Date: Aug. 10, 2023

(65) Prior Publication Data

US 2025/0215837 A1 Jul. 3, 2025

Related U.S. Application Data

(60) Provisional application No. 63/305,673, filed on Feb. 1, 2022.

(51) Int. Cl.
*F02D 19/06* (2006.01)
*F02D 19/02* (2006.01)
(Continued)

(52) U.S. Cl.
CPC ....... *F02D 19/0605* (2013.01); *F02D 19/022* (2013.01); *F02D 41/3836* (2013.01); *F02M 21/0239* (2013.01)

(58) Field of Classification Search
CPC ............... F02D 41/0386; F02D 19/022; F02D 19/0605; F02M 21/0239
See application file for complete search history.

(56) References Cited

U.S. PATENT DOCUMENTS 5,890,459 A 4/1999 Hedrick et al.
7,140,354 B1 * 11/2006 Hashemi ............... F02D 19/024 123/456

(Continued)

FOREIGN PATENT DOCUMENTS

WO 2017190924 A1 11/2017

OTHER PUBLICATIONS

ISR and Written Opinion, mailed Apr. 11, 2023 for international application PCT/CA2023/050124 filed Jan. 30, 2023; 13 pages.

(Continued)

*Primary Examiner* — Kevin A Lathers
(74) *Attorney, Agent, or Firm* — Carie Mager; Paul Schranz

(57) ABSTRACT

A pressure regulation system for a gaseous fluid includes a gaseous fluid supply and a hydraulic fluid supply of a hydraulic fluid. A rail injector is in fluid communication with the gaseous fluid supply and the hydraulic fluid supply and is hydraulically actuated with the hydraulic fluid. A gaseous-fluid rail is in fluid communication with the rail injector and in selective fluid communication with the gaseous fluid supply. A pressure sensor in fluid communication with the gaseous-fluid rail is responsive to gaseous-fluid rail pressure to emit signals representative thereof. A controller communicatively configured with the pressure sensor and the rail injector is programmed to receive the signals representative of the gaseous-fluid rail pressure to determine a measured gaseous-fluid rail pressure; and to actuate the rail injector to inject the gaseous fluid from the gaseous fluid supply into (Continued)

the gaseous-fluid rail as a function of the measured gaseous-fluid rail pressure.

20 Claims, 23 Drawing Sheets

(51) Int. Cl.

| | |
|---|---|
| ***F02D 41/38*** | (2006.01) |
| ***F02M 21/02*** | (2006.01) |

(56) References Cited

U.S. PATENT DOCUMENTS

| | | | | |
|---|---|---|---|---|
| 2001/0007338 | A1 | 7/2001 | Popp | |
| 2013/0255636 | A1* | 10/2013 | Pursifull | F02D 19/0628 123/446 |
| 2014/0238351 | A1 | 8/2014 | Haas et al. | |
| 2017/0074212 | A1 | 3/2017 | Lorts | |
| 2019/0032618 | A1 | 1/2019 | Soleri et al. | |
| 2019/0101070 | A1 | 4/2019 | Mumford | |
| 2019/0178172 | A1* | 6/2019 | Wickstone | F02M 47/027 |

OTHER PUBLICATIONS

Supplemental European Search Report, mail date Jan. 16, 2026, 8 pages, for a corresponding European application 23749307.7.

* cited by examiner

APPARATUS AND METHOD FOR PRESSURE REGULATION OF A GASEOUS FLUID

TECHNICAL FIELD

The present application relates to an apparatus and method for pressure regulation of a fluid, and more particularly for pressure regulation of a first fluid and a second fluid in a dual-fluid system.

BACKGROUND

Hydraulically actuated dual-fuel injectors that can inject a gaseous fuel independently and separately from a liquid fuel typically employ the liquid fuel as a hydraulic fluid. Acting in its capacity as the hydraulic fluid, the liquid fuel is employed to control movement of valve members within the dual-fuel injector and as a sealing fluid to reduce, and ideally prevent, gaseous fuel from leaking out of the injector. A pressure differential between liquid fuel pressure and gaseous fuel pressure is controlled such that the movement of the valve members is properly controlled and for the liquid fuel to function as the fluid seal. The pressure differential between the liquid fuel pressure and the gaseous fuel pressure is sometimes referred to as the bias pressure, or simply the bias. The bias pressure is defined more generally herein as the difference between a higher viscosity fluid pressure and a lower viscosity fluid pressure, for example the bias pressure may be the difference between a liquid fuel pressure and gaseous fuel pressure. A preferred bias pressure has a value greater than zero bar and can also be preferably within a range of such values greater than zero. A smaller bias pressure increases the likelihood of gaseous fuel leaking past a liquid fuel seal and out of the injector as the liquid and gaseous fuel pressures oscillate during operation. A larger bias pressure can increase the amount of liquid fuel that leaks into a gaseous-fuel chamber within the injector that is later injected into a combustion chamber of the engine.

Previous techniques of controlling the bias pressure are disclosed in the Applicant's U.S. Pat. No. 6,298,833 B1, issued on Oct. 9, 2001 (the "'833 Patent") and incorporated herein by reference. In the '833 Patent, several embodiments related to two general techniques of controlling the bias pressure are discussed. One such technique is illustrated in FIG. 2B of the '833 Patent where a gaseous fuel pressure (in fuel line 242) acts as a reference pressure for regulating a liquid fuel pressure (in sealing fluid line 229) supplied to an injection valve (280) to maintain a desired bias pressure between the two fluids being supplied to the injection valve. Contrastingly, in another fuel regulating technique illustrated in FIG. 3B of the '833 patent, a liquid fluid pressure (in sealing fluid line 323) acts as a reference pressure for regulating a gaseous fuel pressure (in fuel line 343) supplied to the injection valve (280) to maintain a desired bias pressure between the two fluids being supplied to the injection valve.

U.S. Pat. No. 6,003,543 A, issued on Dec. 21, 1999, and incorporated herein by reference, discloses an electronic gas regulator employed in an internal combustion engine system which has an internal gas chamber and a high speed solenoid valve that controls the flow of gas into the chamber. A control means, including a microprocessor, receives signals from instrumentation associated with the engine, including from a pressure sensor mounted on the electronic gas regulator, to measure pressure downstream of the valve. The control means generates a pulsed electrical signal with a variable pulse width, frequency or both, to control the high speed solenoid valve; such that the pressure of gas downstream from the valve is modulated towards a set point. There are problems with employing high speed solenoid valves in higher fluid pressure systems. The electromagnetic energy required to directly actuate the solenoid to overcome the sealing pressure of the high pressure fluid is very large and this requires excessively large solenoids. In some applications, either or both the electromagnetic energy and large solenoid requirements are unacceptable.

The state of the art is lacking in techniques for pressure regulation in a dual-fluid system where liquid fluid pressure is regulated based on gaseous fluid pressure. The present apparatus and method provide a technique for improving the pressure regulation in a dual-fuel system.

Among the benefits and improvements that have been disclosed herein, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive.

SUMMARY

An improved apparatus for a pressure regulation system for a gaseous fluid including a gaseous fluid supply and a hydraulic fluid supply is disclosed herein. In one aspect, a rail injector is in fluid communication with both the gaseous fluid supply and the hydraulic fluid supply and is hydraulically actuated with the hydraulic fluid. There is a gaseous-fluid rail in fluid communication with the rail injector and in selective fluid communication with the gaseous fluid supply. The gaseous fluid has a gaseous-fluid rail pressure in the gaseous-fluid rail. A pressure sensor is in fluid communication with the gaseous-fluid rail and is responsive to the gaseous-fluid rail pressure to emit signals representative of the gaseous-fluid rail pressure. A controller is communicatively configured with the pressure sensor and the rail injector and programmed to receive the signals representative of the gaseous-fluid rail pressure to determine a measured gaseous-fluid rail pressure; and to actuate the rail injector to inject the gaseous fluid from the gaseous fluid supply into the gaseous-fluid rail as a function of the measured gaseous-fluid rail pressure.

In an exemplary embodiment, the pressure regulation system is a dual-fluid pressure regulation system for regulating a differential pressure between a liquid fluid and the gaseous fluid. The pressure regulation further includes a liquid-fluid supply and a liquid-fluid rail. There is a liquid-fluid pump pumping the liquid fluid from the liquid-fluid supply into the liquid-fluid rail. The liquid fluid has a liquid-fluid rail pressure in the liquid-fluid rail. A liquid-fluid drain is in fluid communication with an upstream side of the liquid-fluid pump. The pressure regulation system also includes a liquid-fluid regulator responsive to the gaseous fluid in the gaseous-fluid rail to drain the liquid fluid from the liquid-fluid rail to the liquid-fluid drain such that the differential pressure between the liquid-fluid rail pressure and the gaseous-fluid rail pressure is within a predetermined range.

An improved apparatus for a pressure regulator of a differential pressure between a first fluid pressure of a first fluid and a second fluid pressure of a second fluid. The pressure regulator includes a valve between a regulator body and a valve member. The regulator body includes a first-fluid inlet for the first fluid; a first-fluid outlet for the first fluid; a second-fluid port for the second fluid; a first longitudinal bore extending between the first-fluid inlet and the second-fluid port; and an outlet passageway extending from the first longitudinal bore to the first-fluid outlet. The valve is in fluid communication with the first-fluid inlet on an inlet side of the valve and in fluid communication with the first-fluid outlet on an outlet side of the valve. The valve member is moveably disposed within the first longitudinal bore of the regulator body between a first-fluid-pressure sensing chamber and a second-fluid-pressure sensing chamber. The first-fluid-pressure sensing chamber is in fluid communication with the first-fluid inlet and the second-fluid-pressure sensing chamber is in fluid communication with the second-fluid port. The valve member is moveable between a range of overlap positions and a range of zero-overlap positions to maintain the differential pressure between the first fluid and the second fluid within a predetermined range. In the range of overlap positions the first-fluid inlet is in indirect fluid communication with the outlet passageway in the regulator body through a first match fit formed between an outer surface of the valve member and a bore wall of the regulator body. In the range of zero-overlap positions the first-fluid inlet is in direct fluid communication with the outlet passageway such that the cross-sectional flow area through the valve increases as the valve member moves further away from the range of overlap positions.

Objects and advantages pertaining to pressure regulation of a gaseous fluid and a liquid fluid in a dual-fluid system may become apparent upon referring to the example illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The figures constitute a part of this specification and include illustrative embodiments of the present invention and illustrate various objects and features thereof. Further, the figures are not necessarily to scale, some features may be exaggerated or diminished relative to others or omitted entirely. The drawings should not be regarded as being to scale unless explicitly indicated as being to scale. The embodiments shown are only examples and should not be construed as limiting the scope of the present disclosure or appended claims. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

DETAILED DESCRIPTION

Figure 1:
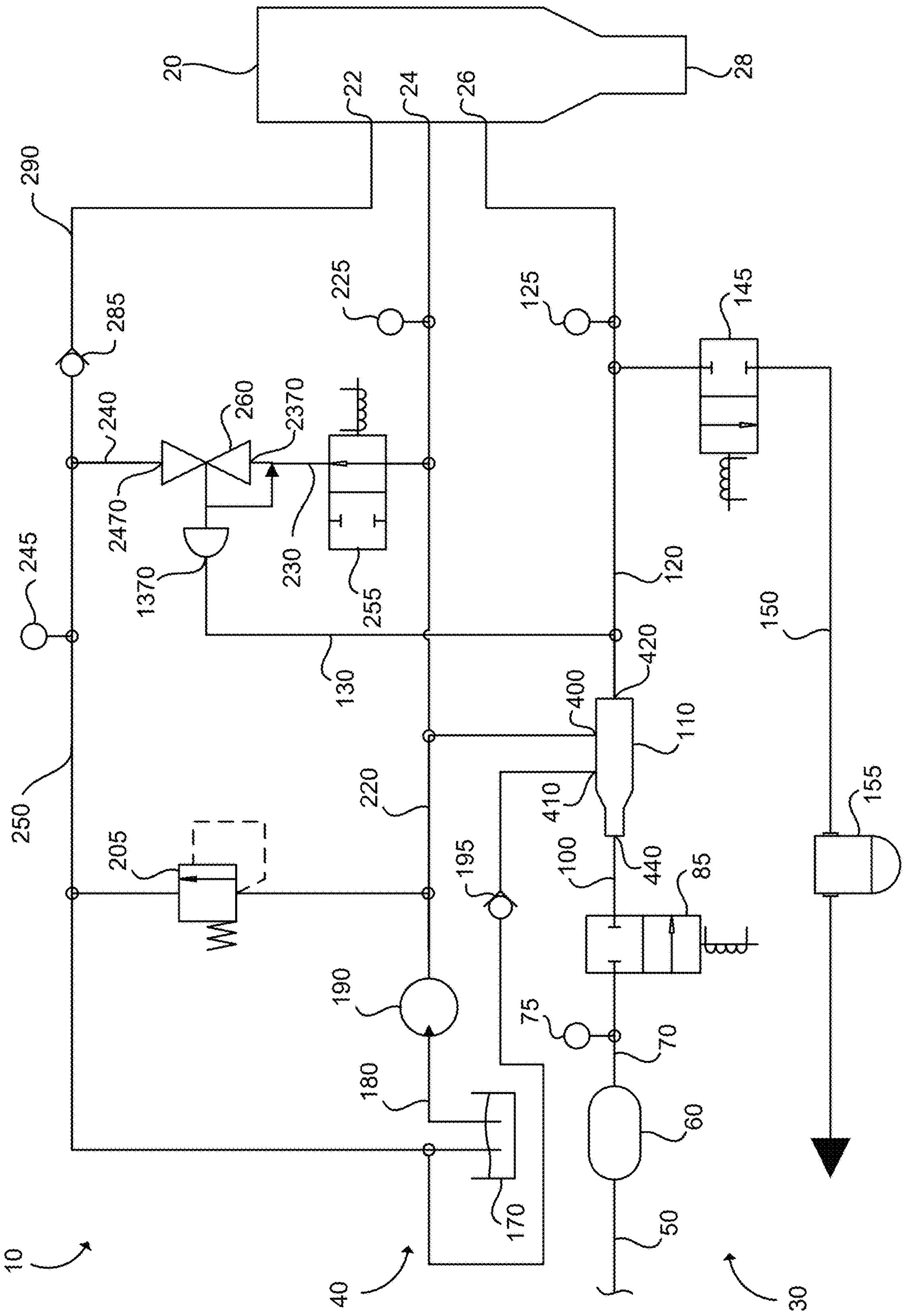
FIG. 1 is a schematic view of a dual-fluid system according to an embodiment.

Throughout the specification and claims, the following terms take the meanings explicitly associated herein, unless the context clearly dictates otherwise. The phrases "in some embodiments", "in an exemplary embodiment," "in exemplary embodiments," and "in some exemplary embodiments" as used herein do not necessarily refer to the same embodiment(s), though it may. Furthermore, the phrases "in other embodiments," "in other exemplary embodiments," "in another embodiment," and "in some other embodiments" as used herein do not necessarily refer to a different embodiment, although it may. Thus, as described below, various embodiments of the invention may be readily combined, without departing from the scope of the invention.

The term "and/or" is used herein to mean "one or the other or both". In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references unless the context clearly dictates otherwise. The phrase "difference between X and Y" shall be interpreted as "X minus Y", while the "difference between Y and X" shall be interpreted as "Y minus X". The term "substantially," as modifying a parameter having a stated limit, is to be construed as meaning something that effectively possesses the same property or achieves the same function as that of the stated limit, and includes exactly the stated limit as well as insignificant deviations therefrom.

Although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein. In cases where examples are listed, it is to be understood that combinations of any of the alternative examples are also envisioned. The scope of the invention is not to be limited to the particular embodiments disclosed herein, which serve merely as examples representative of the limitations recited in the issued claims resulting from this application, and the equivalents of those limitations.

Various features may be grouped together in exemplary embodiments for the purpose of streamlining the disclosure, but this method of disclosure should not be interpreted as reflecting an intention that any claimed embodiment requires more features than are expressly recited in a corresponding claim. Rather, inventive subject matter may lie in less than all features of a single disclosed exemplary embodiment or may combine features from different figures or different embodiments. Thus, the appended claims are hereby incorporated into the detailed description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein or disclosed in a single figure or embodiment. Conversely, the scope of the appended claims does not necessarily encompass the whole of the subject matter disclosed herein.

Referring to the drawings and first to FIG. 1, there is shown dual-fluid system 10 that regulates both a pressure of a first fluid and a differential pressure between a first fluid and the second fluid, in addition to other functions. The differential pressure is defined herein to be the difference between a pressure of the first fluid and a pressure of the second fluid. In an exemplary embodiment, the first fluid is a liquid fluid and the second fluid is a gaseous fluid and more particularly one or both fluids may be a fuel such as a liquid fuel and/or a gaseous fuel respectively; however, in other embodiments the first and second fluids can both be a liquid fluid or the first and second fluids can both be a gaseous fluid. As used herein, a gaseous fuel is any fuel that is the gas phase (or state) at standard temperature and pressure (STP), where standard temperature is defined herein as zero degrees Celsius (0° C.) and standard pressure is defined herein as an absolute pressure of one bar (1 bar). In some exemplary embodiments, dual-fluid system 10 may be a mono-fuel system such as a gaseous-fuel system employing a liquid as a hydraulic fluid; or such as a liquid-fuel system employing another fluid as an oxidant or a fuel additive in a mono-fuel injector. In other exemplary embodiments, dual-fluid system 10 may be a dual-fuel system delivering both a liquid fuel and a gaseous fuel to a dual-fluid injector which can then be referred to as a dual-fuel injector. Many of the same benefits and features of an exemplary system described herein directed to a dual-fluid system delivering two fluids to a dual-fuel injector are also applicable to a dual-fluid system delivering a single fuel and another fluid to a mono-fuel injector or two fluids to a dual-fluid injector or some other end use device where regulating the pressure of two fluids of disparate viscosities relative to one another is desirable.

Dual-fluid system 10 is now described as an exemplary dual-fuel system 10 which delivers a gaseous fuel and a liquid fuel to a fuel consumer, which in the illustrated embodiment is dual-fuel injector 20, at a predetermined gaseous-fuel rail pressure and a predetermined liquid-fuel rail pressure respectively. Although only one dual-fuel injector 20 is illustrated, it is understood that there can be a plurality of dual-fuel injectors. Dual-fuel injector 20 is a hydraulically actuated injector that can inject the gaseous fuel separately and independently of the liquid fuel, and similarly can inject the liquid fuel separately and independently of the gaseous fuel; although this is not a requirement of dual-fuel system 10. In an exemplary embodiment, dual-fuel injector 20 injects the gaseous and liquid fuels into a combustion chamber of an internal combustion engine, although again this is not a requirement. A liquid fuel, such as diesel, is a more easily ignited fuel than some gaseous fuels, such as natural gas or hydrogen, and can be employed to create a pressure and temperature environment within the combustion chamber suitable for the ignition of the gaseous fuel. Natural gas and hydrogen are disclosed herein as exemplary gaseous fluids; however, any fluid which is delivered to the injector in gaseous form including but not limited to biogas, methane, natural gas, syngas, air, or gaseous mixtures thereof are similarly contemplated. Other suitable fuels which are gaseous at standard temperature and pressure but may be in liquid form when employed in a high pressure injection system (for example greater than 100 bar) such that the fuel is in liquid form when delivered to an injector of the high pressure injection system, such as liquefied petroleum gas or dimethyl ether, are also suitable for the ignition of lower cetane gaseous fuels and can be employed in a dual-fuel system as a liquid fuel as well as a fuel in a mono-fuel system. In other embodiments, the liquid can be employed for reasons other than as an ignition aid. Dual-fuel system 10 includes gaseous-fuel system 30 and liquid-fuel system 40.

Gaseous-fuel system 30 regulates the pressure of the gaseous fuel from a higher pressure to the predetermined gaseous-fuel rail pressure. Pressurized supply 60 is a higher-pressure supply of the gaseous fuel that in the illustrated embodiment is an accumulator receiving pressurized gaseous-fuel from an upstream source through conduit 50. For example, the accumulator can receive the gaseous fuel from a heat exchanger that vaporizes a liquefied form of the gaseous fuel received from a cryogenic pump. The higher-pressure of the gaseous fuel is relative to the downstream pressure of the gaseous fuel. In other embodiments, the higher-pressure supply of the gaseous fuel can be, for example, one or more gaseous-fuel pressurized cylinders, such as compressed natural gas cylinders, in combination with a compressor for maintaining the pressure of the gaseous fuel delivered to conduit 70 from the cylinders above the predetermined gaseous-fuel rail pressure. The pressure of the gaseous fuel in pressurized supply 60 is referred to herein as gaseous fuel supply pressure. Rail injector 110 is in fluid communication with accumulator 60 through shut-off valve 85. Shut-off valve 85 is commanded by control unit 300 (shown in FIG. 2) to an open position when the internal combustion engine is operated and to a closed position to isolate pressurized supply 60 from rail injector 110 when the internal combustion engine is turned off. Rail injector 110 is commanded by control unit 300 to inject discrete amounts of the gaseous fuel into gaseous-fuel rail 120. For the purpose of this disclosure, gaseous-fuel rail pressure is the pressure of the gaseous fuel in gaseous-fuel rail 120. In other embodiments, rail injector 110 can function as the shut-off valve such that shut-off valve 85 is not needed. Pressure-relief valve 145 is employed to selectively vent the gaseous fuel from gaseous-fuel rail 120 when commanded by control unit 300 such as whenever the gaseous-fuel rail pressure rises above a predetermined gaseous-fuel vent pressure, or during shut-down of the internal combustion engine to evacuate gaseous-fuel rail 120 of the gaseous-fuel, or whenever the system bias pressure is too low or negative. In the event gaseous fuel is vented into conduit 150, it may be optionally communicated through separator 155 that separates any liquid fluid constituents in the gaseous fuel before delivering the gaseous fuel to a vent processor (not shown). Liquid fluid constituents can be added to the gaseous fuel within rail injector 110 as will be explained in more detail below. The vent processor can be, for example, a burner (not shown) that burns the vented gaseous fuel and/or an apparatus for returning the gaseous fuel to a low pressure supply of the gaseous fuel (not shown), such as a cryogenic storage vessel holding a liquefied supply of the gaseous fuel. Both shut-off valve 85 and pressure-relief valve 145 are solenoid valves in the illustrated embodiment controlled by control unit 300 (seen in FIG. 2), although this is not a requirement. Alternatively, each of the valves 85 and 145 can be a mechanically-actuated-type valve, or there can be mechanically-actuated-type valves in addition to valves 85 and 145. Pressure sensor 75 monitors gaseous-fuel pressure in conduit 70 upstream of shut-off valve 85 in the illustrated embodiment and is representative of the gaseous-fuel supply pressure in accumulator 60. Alternatively, pressure sensor 75 can be in accumulator 60 or associated with conduit 50 upstream thereof. Pressure sensor 125 monitors gaseous-fuel rail pressure in gaseous-fuel rail 120. Pressure sensors 75 and 125 emit signals representative of the pressures that they monitor, as will be described in more detail below.

Liquid-fuel system 40 pressurizes the liquid fuel from a low-pressure supply of the liquid fuel and then regulates the pressure of the pressurized liquid fuel such that the differential pressure between the liquid fuel and the gaseous fuel is within a predetermined range. The liquid fuel is stored in storage tank 170 where it is typically stored at a pressure that is at or near atmospheric pressure, which in the context of this application is considered low pressure. Liquid-fuel pump 190 is commanded by control unit 300 (seen in FIG. 2) to pressurize the liquid fuel received from storage tank 170 through conduit 180 and to deliver the pressurized liquid fuel into liquid-fuel rail 220. For the purpose of this disclosure, liquid-fuel rail pressure is the pressure of the liquid fuel in liquid-fuel rail 220. Liquid-fuel pump 190 can include an inlet metering valve to assist in regulating the flow of the liquid fuel into the pump. In other embodiments, there can be a transfer pump (not shown) inside storage tank 170 to assist in transferring the liquid fuel into conduit 180. Pressure-relief valve 205 is a pressure-activated valve that relieves the liquid fuel from liquid-fuel rail 220 into liquid-fuel drain 250 whenever the liquid-fuel rail pressure rises above a predetermined liquid-fuel relief pressure. In other embodiments, pressure-relief valve 205 can be a solenoid activated valve that can be commanded by control unit 300 (seen in FIG. 2) to open as required, or there can be a solenoid activated valve in addition to a mechanically activated pressure relief valve. Isolation valve 255 can be commanded by control unit 300 (seen in FIG. 2) to selectively isolate liquid-fuel regulator 260 from liquid-fuel rail 220. For example, when the internal combustion engine is operating by consuming only the liquid fuel then isolation valve 255 can be commanded to a closed position, whereas typically the isolation valve is in an open position. Liquid-fuel regulator 260 is a differential-pressure regulator and a back-pressure regulator that fluidly communicates the liquid-fuel from liquid-fuel rail 220 into liquid-fuel drain 250 based on the gaseous-fuel rail pressure sensed in conduit 130 such that the differential pressure between the liquid-fuel rail pressure and the gaseous-fuel rail pressure is within the predetermined range. Liquid-fuel regulator 260 can be a spool-type regulator that employs a needle or a dome-loaded regulator that employs a piston, plunger, diaphragm, or any combination thereof to sense the bias and modulate a valve (not shown) in the liquid-fuel regulator that controls the flow of the liquid fuel from liquid-fuel rail 220 to liquid-fuel drain 250. A match fit between the piston or the plunger and the bore in which they reciprocate can be used to limit the leakage of the liquid fuel in liquid-fuel rail 220 into gaseous-fuel rail 120, as will be described in more detail below. Liquid-fuel drain 250 also receives the liquid-fuel from drain outlet 22 of dual-fuel injector 20 through conduit 290 and check valve 285. Dual-fuel injector 20 employs the liquid fuel as a hydraulic fluid within the injector for controlling injection valves therein in addition to injecting the liquid fuel. The liquid fuel flows into dual-fuel injector 20 from liquid-fuel rail 220 at liquid-fuel inlet 24. A mono-fuel injector may have a similarly arranged liquid-fluid inlet 24 and a drain outlet 22. During operation of injector 20 the hydraulic fluid is drained therefrom as injection valves are opened. The liquid in liquid-fuel drain 250 is returned to storage tank 170 such that it can be re-pressurized by liquid-fuel pump 190. Pressure sensor 245 monitors liquid-fuel drain pressure in liquid-fuel drain 250, and pressure sensor 225 monitors liquid-fuel rail pressure in liquid-fuel rail 220. Pressure sensors 225 and 245 emit signals representative of the pressures that they monitor, as will be described in more detail below. In the illustrated embodiment, pressure sensor 245 provides pressure information about liquid-fuel drain 250, which may be advantageous to detect gaseous-fuel pressure leaks where the gaseous-fuel is leaking from either dual-fuel injector 20 or rail injector 110 or liquid-fuel regulator 260 into the liquid fuel. In other embodiments, pressure sensor 245 is not required.

Figure 2:
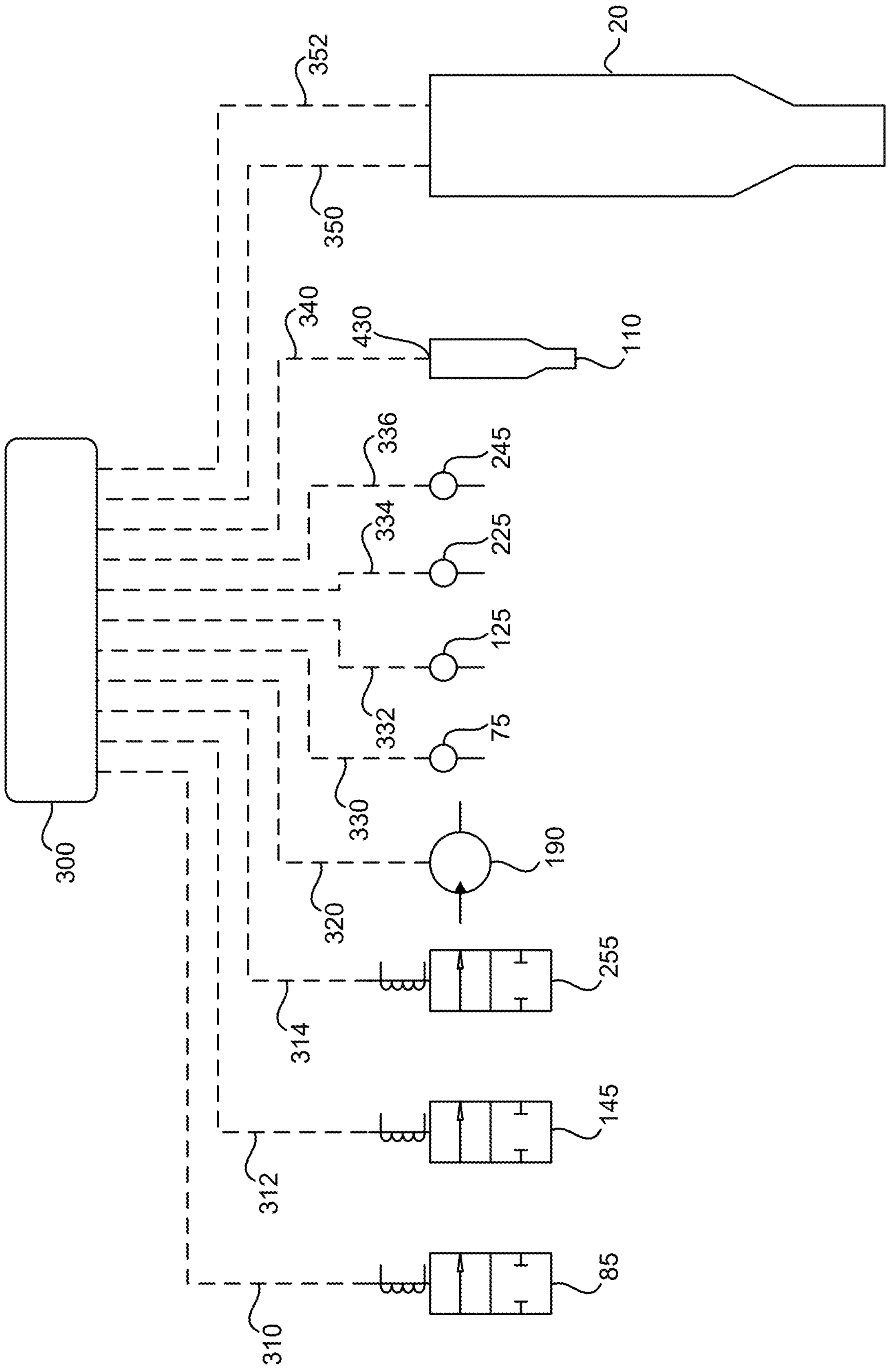
FIG. 2 is a schematic view of a control schema of the dual-fluid system of FIG. 1.

Referring now to FIG. 2, there is shown a schematic view of a control schema of dual-fuel system 10. Control unit 300 is communicatively connected to shut-off valve 85; gaseous-fuel vent valve 145; isolation valve 255; liquid-fuel pump 190; pressure sensors 75, 125, 225 and 245; rail injector 110; and dual-fuel injector 20 by way of communication lines 310, 312, 314, 320, 330, 332, 334, 336, 340, 350 and 352 respectively illustrated as dashed lines. Dashed communication lines herein indicate communications lines which can be wired or wirelessly connected between each system device and control unit 300 where appropriate and depending on the system design preferences. Communication lines 310, 312 and 314 are employed to transmit command signals from control unit 300 to solenoid valves 85, 145 and 255, respectively, to be commanded into one of a pass-through (that is, open) position and a shut-off (that is, closed) position. Communication line 320 is employed to transmit a command signal from control unit 300 to liquid-fuel pump 190 to pressurize the liquid fuel from storage tank 170. Communication lines 330, 332, 334 and 336 are employed to transmit to control unit 300 the signals generated by the respective pressure sensors 75, 125, 225 and 245 that are representative of the pressures measured thereof. In some embodiments, sensors 75, 125, 225 and 245 can also communicate temperature and/or optical sensor data to control unit 300. Communication line 340 is employed to transmit a command signal from control unit 300 to rail injector 110 to inject the gaseous fuel from conduit 100 into gaseous-fuel rail 120. Communication line 350 is employed to transmit a command signal from control unit 300 to dual-fuel injector 20 to inject the liquid fuel and communication line 352 is employed to transmit a command signal from control unit 300 to the dual-fuel injector to inject the gaseous fuel. Communication lines 310, 312, 314, 320, 330, 332, 334, 336, 340, 350 and 352 can carry electronic and/or photonic signals to and/or from control unit 300, and in exemplary embodiments are one or more wires. Control unit 300 is an electronic controller in an exemplary embodiment that can comprise both hardware and software components. The hardware components can comprise digital and/or analog electronic components. In the embodiments herein, control unit 300 comprises a processor and memories, including one or more permanent memories, such as FLASH, EEPROM and a hard disk, and a temporary memory, such as SRAM and DRAM, for storing and executing a program. As used herein, the terms algorithm, module and step refer to an application specific integrated circuit (ASIC), an electronic circuit, a processor (shared, dedicated, or group) and memory that execute one or more software or firmware programs, a combinational logic circuit, and/or other suitable components that provide the described functionality. The algorithms, modules and steps that are performed by control unit 300 are part of the control unit. Control unit 300 can be also referred to as a controller or an electronic controller. Control unit 300 can be programmed with any one of, and preferably all of, a feedback control algorithm, a feedforward control algorithm and a transition control algorithm. Considering first the feedback control algorithm, control unit 300 can be programmed to receive the signals representative of the gaseous-fuel rail pressure, determine a measured gaseous-fuel rail pressure based on these signals, determine a difference between the measured gaseous-fuel rail pressure and a desired gaseous-fuel rail pressure where the difference is an error signal, and to actuate rail injector 110 to inject the gaseous fuel from the supply of gaseous fuel into the gaseous-fuel rail such that the difference is reduced. The desired gaseous-fuel rail pressure is primarily determined from engine parameters, such as engine speed, engine load, pedal position (for a Diesel-cycle engine) or throttle position (for an Otto-cycle engine) and boost pressure (the pressure in the intake manifold in a turbo-charged or supercharged engine). The feedforward control algorithm can be employed to proactively actuate rail injector 110 to inject gaseous-fuel mass into gaseous-fuel rail 120 such that the inflow of mass into the gaseous-fuel rail matches the expected outflow of mass to the fuel consumer, which in the illustrated embodiment is dual-fuel injector 20. The transition control algorithm can be employed to determine an amount of gaseous-fuel mass that needs to be injected in gaseous-fuel rail 120 when the desired gaseous-fuel rail pressure changes, and to actuate rail injector 110 either in one injection or a plurality of injections in order to inject the amount of gaseous-fuel mass determined.

Figure 3:
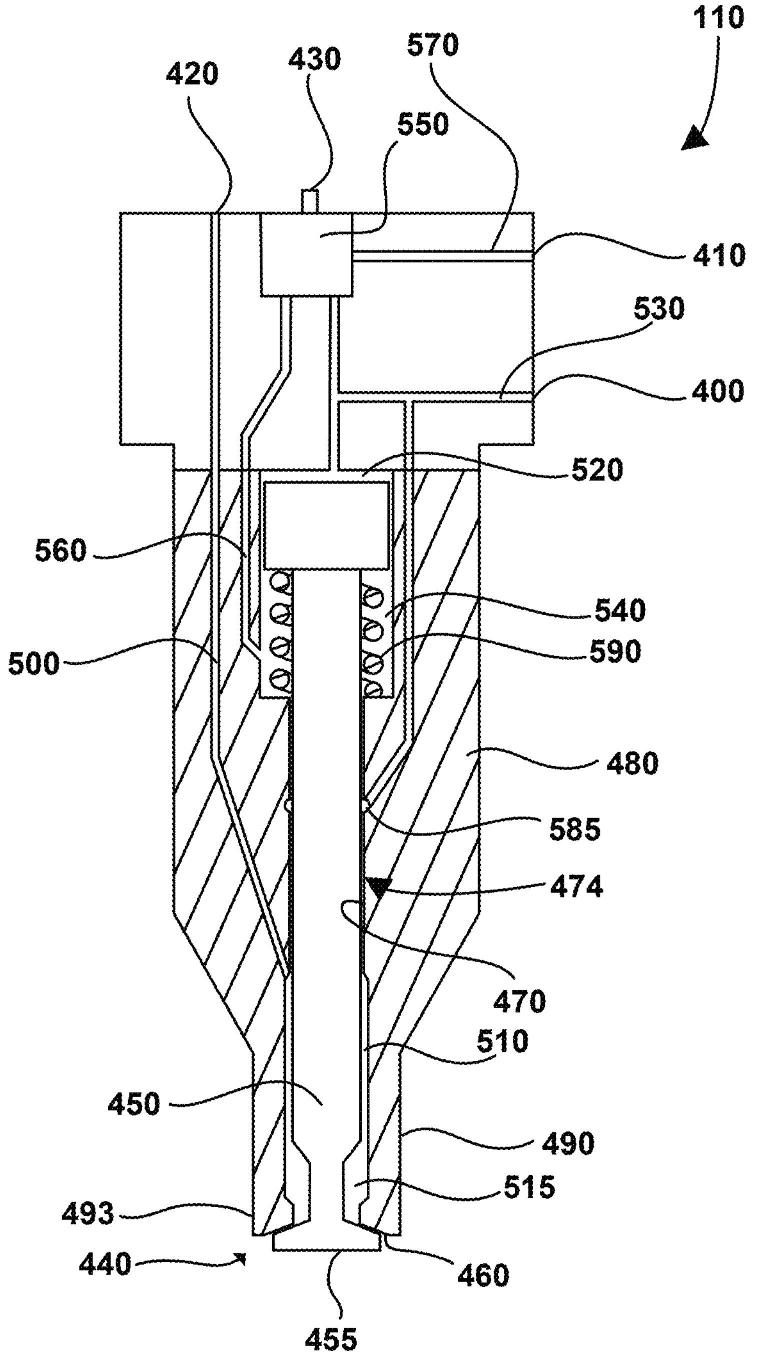
FIG. 3 is a cross-sectional schematic view of a rail injector of the dual-fluid system of FIG. 1.

Referring now to FIG. 3, rail injector 110 is described in more detail. In an exemplary embodiment, rail injector 110 is a hydraulically-actuated, outwardly-opening, gaseous-fuel injector. Rail injector 110 includes hydraulic-fluid inlet 400, hydraulic-fluid outlet 410, gaseous-fuel outlet 420, activation terminal 430 and gaseous-fuel injection valve 440. As seen in the illustrated embodiment of FIG. 1, hydraulic-fluid inlet 400 is fluidly connected with liquid-fuel rail 220, and hydraulic-fluid outlet 410 is fluidly connected with liquid-fuel drain 250 through check-valve 195. Advantageously, gaseous-fuel outlet 420 is fluidly connected with gaseous-fuel rail 120; and injection valve 440 is fluidly connected with conduit 100, which is the opposite way that an outwardly opening injector is to be configured, as will be described in more detail below. Liquid-fuel rail 220 operates as a hydraulic fluid supply for rail injector 110, and the liquid fuel is a hydraulic fluid for the rail injector. In other embodiments, a separate hydraulic fluid supply can be employed that is separate and distinct from liquid-fuel rail 220 to supply rail injector 110 with a separate hydraulic fluid (which may also be the liquid fuel but from a different pumping source). However, it is advantageous to employ the liquid fuel from liquid-fuel rail 220 as the hydraulic fluid for the rail injector since the pressurized liquid fuel is already available and taking advantage of this reduces system complexity and cost as well as parasitic losses. Alternatively, a second liquid-fuel pump can be employed to pressurize the liquid fuel from liquid-fuel rail 220 to an even higher pressure and then communicate the higher-pressure liquid fuel to rail injector 110 as a supply of hydraulic fluid; however, an extra pump also increases the cost of the system and parasitic losses. An input of the second liquid-fuel pump can be connected to liquid-fuel rail 220 or to conduit 180, and the output of the second liquid-fuel pump is connected to hydraulic-fluid inlet 400 of rail injector 110. As seen in FIG. 2, activation terminal 430 is communicatively connected with control unit 300. Returning to FIG. 3, injection valve 440 is a gaseous-fuel inlet of rail injector 110 and includes valve member 450 and valve seat 460. Valve member 450 is slidably received and reciprocatable within cylindrical bore 470 formed in rail injector body 480. Valve seat 460 is formed at a distal end of nozzle 490 of rail injector body 480. In other embodiments, nozzle 490 can extend outwardly away from valve seat 460 forming a tubular shroud around injection valve 440, in which circumstance the shroud can be considered the gaseous-fuel inlet of rail injector 110 upstream from injection valve 440. A contact surface area between valve member 450 and valve seat 460 is annular in shape in an exemplary embodiment.

Gaseous-fuel conduit 500 delivers gaseous fuel from annular passage 510 to gaseous-fuel outlet 420. As shown in FIG. 3 annular passage 510 and gaseous-fuel conduit 500 are downstream of injection valve 440. Chamber 515 allows a diameter of valve member 450 in bore 470 to be equal to an inner diameter of valve seat 460, which improves the ability to open the valve member, as will be described in more detail below. Opening control chamber 520 can be fluidly connected with hydraulic-fluid inlet 400 by way of hydraulic-fluid conduit 530. Closing control chamber 540 can be fluidly connected with actuation valve 550 by way hydraulic-fluid conduit 560. In the illustrated embodiment, actuation valve 550 is a three-way actuation valve 550 that is additionally fluidly connected with hydraulic-fluid inlet 400 by way of hydraulic-fluid conduit 530, and with hydraulic-fluid outlet 410 by way of hydraulic-fluid conduit 570. In other embodiments, actuation valve 550 can be a two-way actuation valve such as disclosed in Applicant's U.S. Pat. No. 11,053,866 B2 issued on Jul. 6, 2021. Returning to FIG. 3, a bore wall defining cylindrical bore 470 has annular groove 585 formed therein which is in fluid communication with hydraulic-fluid conduit 530 such that a liquid-ring seal is formed around valve member 450 to reduce and preferably prevent the gaseous fuel in annular passage 510 from leaking into closing control chamber 540 and out of the injector when the closing control chamber 540 is at a relatively lower pressure during operation. Match fit 474 formed between outer surface of valve member 450 and a bore wall of rail injector body 480 extends along at least a portion of the bore wall of cylindrical bore 470. Match fit 474 is lubricated with the hydraulic fluid from closing control chamber 540 and annular groove 585 and operates to guide valve member 450 as well as control leakage of the hydraulic fluid into annular passage 510. Spring 590 is a helical compression spring in the illustrated embodiment and is disposed within closing control chamber 540 and biases valve member 450 in a closing direction towards valve seat 460 such that injection valve 440 is in a closed position. Rail injector 110 can include threaded surface 493 around an outside of nozzle 490 such that the rail injector can be connected with conduit 100 directly or by means of a threaded coupling or a fitting. In other embodiments, the distal end of nozzle 490 can protrude outwardly beyond valve member 450 such that an interior threaded surface of this protrusion can be threadedly coupled to conduit 100 or the fitting. In other embodiments, spring 590 can be disposed in conduit 100, or in the fitting connecting conduit 100 to rail injector 110, or in the protruding distal end of nozzle 490, such that the spring abuts surface 455 of valve member 450 with the opposite end of the spring fixed whereby the spring biases the valve member in the closing direction, which is upwards with respect to FIG. 3.

The operation of rail injector 110 will now be discussed. Actuation valve 550 operates to fluidly connect closing control chamber 540 between either hydraulic-fluid inlet 400 or hydraulic-fluid outlet 410. Actuation valve 550 is commanded to fluidly connect closing control chamber 540 with hydraulic-fluid inlet 400 such that both the closing control chamber and opening control chamber 520 contain the hydraulic fluid at the liquid-fuel rail pressure (that is, at relatively high pressure) such that injection valve 440 moves to and remains in the closed position. The opening force generated by the pressure of the hydraulic fluid in opening control chamber 520 acting on valve member 450 is less than the combined closing force of the force generated by (1) the pressure of the gaseous fuel in conduit 100 (seen in FIG. 1) acting on valve member 450, (2) the pressure of the hydraulic fluid in closing control chamber 540 acting on the valve member, (3) gaseous-fuel pressure in chamber 515 acting on valve member 450, and (4) the force generated by spring 590 acting on the valve member such that the valve member moves to and remains in the closed position. Actuation valve 550 is commanded to fluidly connect closing control chamber 540 with hydraulic-fluid outlet 410 such that the closing control chamber is cut-off from the relatively high-pressure hydraulic fluid in conduit 530 and instead is fluidly connected to the relatively low-pressure liquid-fuel drain 250, such that the valve member moves to and remains in the open position as a result of the high pressure of the hydraulic fluid in opening control chamber 520. The opening force generated by the pressure of the hydraulic fluid in opening control chamber 520 acting on valve member 450 is greater than the combined closing force of the force generated by (1) the pressure of the gaseous fuel in conduit 100 (seen in FIG. 1) acting on valve member 450, (2) the gaseous-fuel pressure in chamber 515 acting on valve member 450, and (3) the force generated by spring 590 acting on the valve member such that the valve member moves to and remains in the opened position.

Referring again to FIG. 1, advantageously, injection valve 440 is fluidly connected with conduit 100 and gaseous-fuel outlet 420 is fluidly connected with gaseous-fuel rail 120, which is the opposite way that an outwardly opening injector is typically configured. That is, when injection valve 440 is opened the gaseous fuel flows from conduit 100 through the injection valve into rail injector 110 and then travels through the injector to gaseous-fuel outlet 420 where it exits to gaseous-fuel rail 120. Typically, the fluid that is to be injected by an outwardly-opening injector, or any injector, is contained within the injector and then exits the injector through an injection valve. This typical operation poses a problem in dual-fuel system 10. Gaseous-fuel supply pressure in pressurized supply 60 is greater than gaseous-fuel rail pressure in gaseous-fuel rail 120 and can be greater than liquid-fuel rail pressure in liquid-fuel rail 220. The liquid-fuel ring seal in annular groove 585 (seen in FIG. 3) cannot seal against the (higher) gaseous-fuel supply pressure in conduit 100. By keeping gaseous-fuel supply pressure on the opposite side of injection valve 440 compared to the liquid-fuel ring seal in rail injector 110, the gaseous fuel will not leak through the lower pressure hydraulic fluid when the injection valve is in the closed position. It is advantageous to employ the gaseous-fuel supply pressure in pressurized supply 60 to hold valve member 450 in the outwardly opening rail injector 110 tightly against valve seat 460 (that is, in the closed position), since this is the highest pressure acting on the rail injector. When the second liquid-fuel pump (not shown) is employed to pressurize the liquid fuel to a pressure higher than the gaseous-fuel supply pressure, then rail injector 110 can be connected in the opposite configuration, that is conduit 100 can be connected to gaseous-fuel outlet 420 (that operates as an inlet in this circumstance) and gaseous-fuel rail 120 can be connected to nozzle 490 of the rail injector (that operates as an outlet in this circumstance).

Figure 4A:
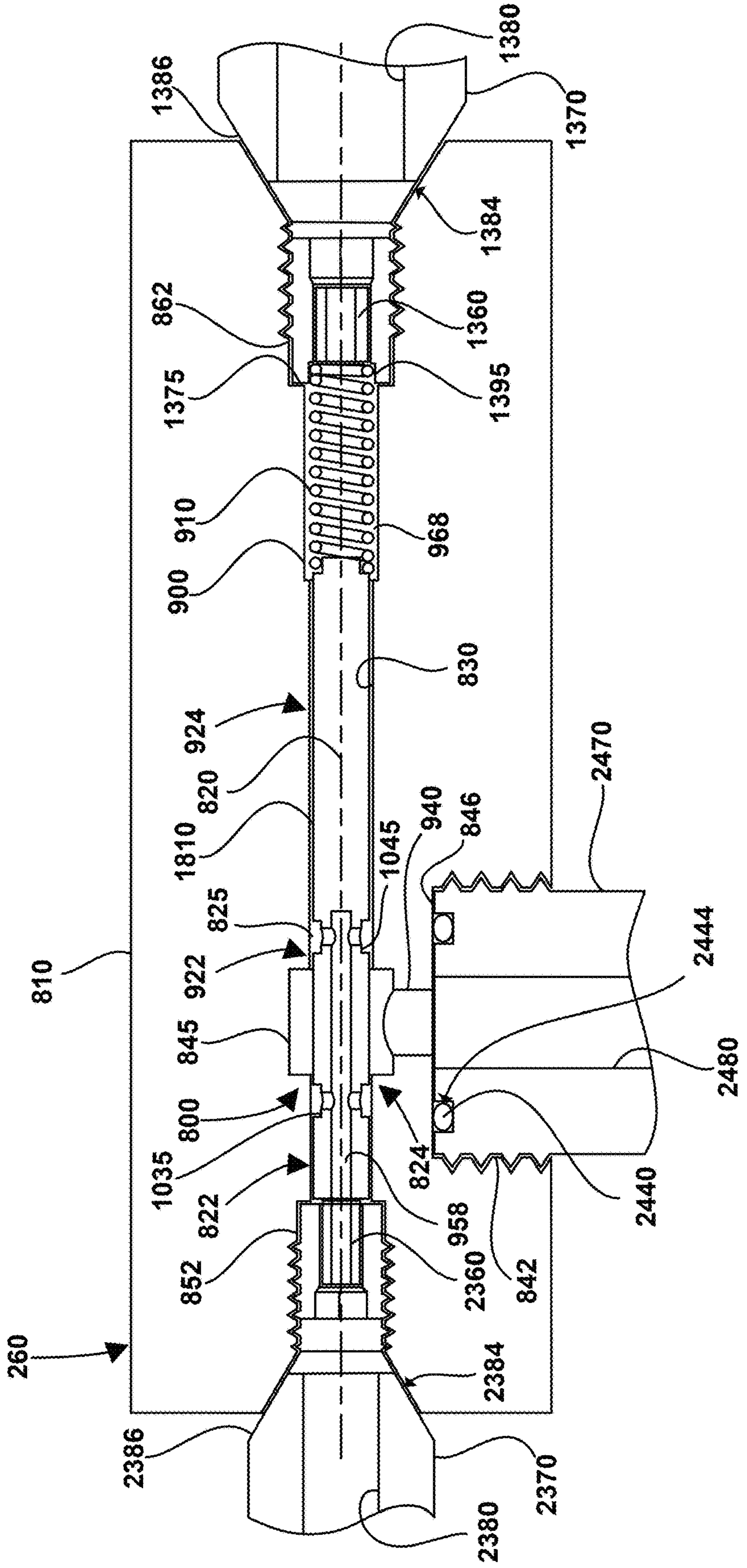
FIG. 4*a* is a cross-sectional view of a liquid-fluid regulator illustrated in a closed position of the dual-fluid system of FIG. 1.
Figure 5:
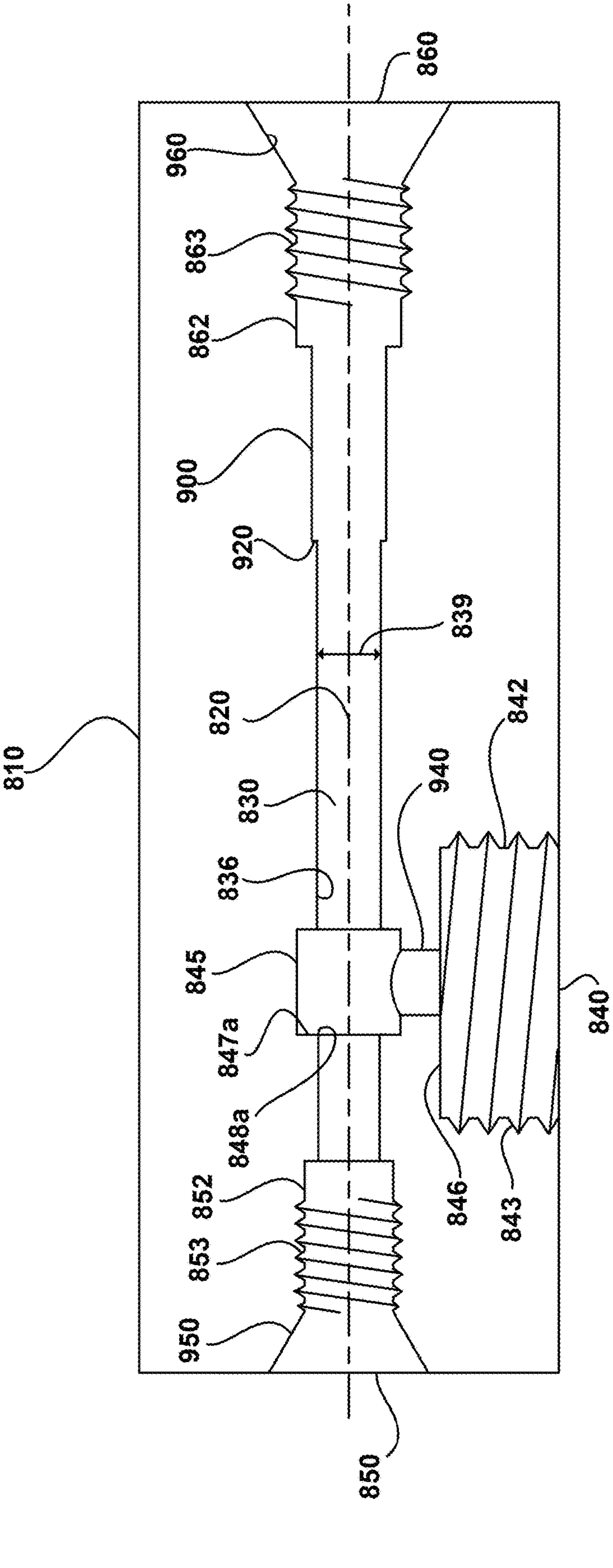
FIG. 5 is a cross-sectional view of a regulator body of the liquid-fluid regulator of FIG. 4*a*.

Referring now to FIGS. **4*a*, 4*b*, 5 and 6, and first to FIGS. 4*a* and 5, liquid-fuel regulator 260 is described in more detail. Liquid-fuel regulator 260 includes regulating valve 800 formed between regulator body 810 and valve member 1810 (also called a spool) slidable within a first longitudinal bore 830 formed in the regulator body. Regulating valve 800 is a new type of spool valve. As used herein, each bore is defined by a bore wall and/or an inner surface within the body in which the bore is formed and all bores and combination of bores that allow fluid communication of a fluid, such as a liquid fluid or a gaseous fluid, can also be referred to as passageways or channels, for fluid. Some bores that are illustrated as being straight are not necessarily straight and can be formed with curved and/or straight sections. First longitudinal bore 830, defined by first bore wall 836 of regulator body 810 having a first diameter 839, extends between liquid-fuel inlet receptacle 852 of liquid-fuel inlet 850 and gaseous-fuel receptacle 862 of gaseous-fuel port 860. Regulator body annular groove 845 formed in bore wall 836 of regulator body 810 is defined in part by annular sidewalls including first groove sidewall 847***a* closer to first-fluid inlet 850 than second groove sidewall 847*b* and annular edges including first groove edge 848*a* closer to first-fluid inlet 850 than second groove edge 848*b*, and annular groove 845 extends substantially radially with respect to longitudinal axis 820 of regulator body 810. An enlarged second diameter bore portion 900 of bore 830 is employed as a spring retainer that sets a hard-stop position for one end of spring 910 when the spring abuts annular shelf 920 (seen in FIG. 5). Bore 940 extends radially with respect to longitudinal axis 820 in the illustrated embodiment between inner wall of annular groove 845 and liquid-fuel outlet receptacle 842 of liquid-fuel outlet 840. Gaseous-fuel receptacle 862 includes threaded section 863 and sealing surface 960 (best seen in FIG. 5). In the illustrated embodiment sealing surface 960 is in the form of a conical frustum (that is, a frustoconical surface); however, in other embodiments the surface can be a spherical surface, a parabolic surface, an elliptical surface, a hyperbolic surface as well as other types of surface shapes. Liquid-fuel inlet receptacle 852 includes threaded section 853 and sealing surface 950. Liquid-fuel outlet receptacle 842 includes threaded section 843 and sealing surface 846, which in the illustrated embodiment is a flat, annular sealing-surface. In other embodiments, it is possible that instead of employing threaded sections 863, 853 and 843 different fastening methods could be employed to fasten couplers to receptacles 862, 852 and 842 respectively, such as a nut and bolt fasteners, or nut and threaded boss fasteners, or other fastening techniques.

Figure 4B:
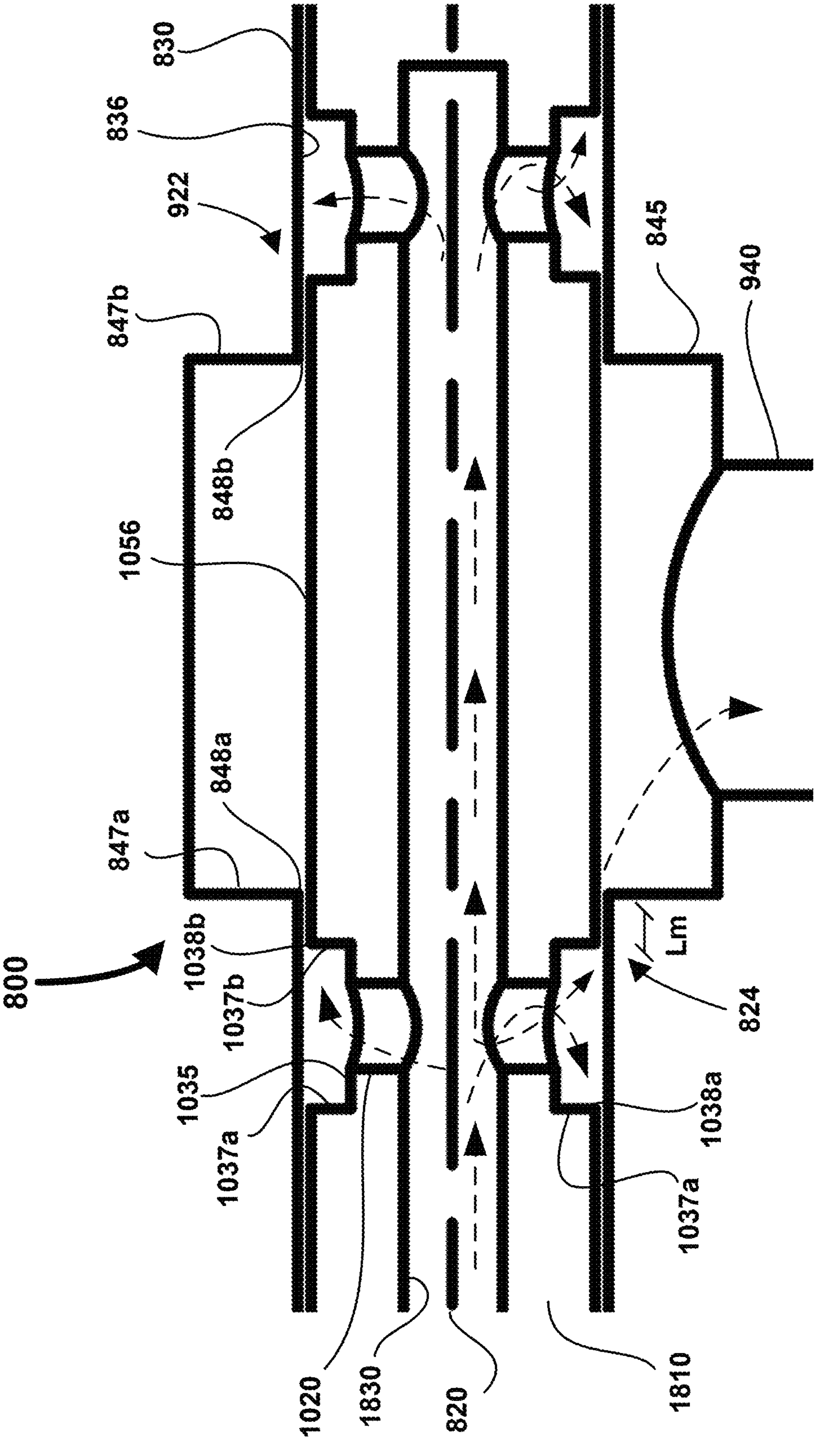
FIG. 4*b* is a portion of the liquid fluid regulator illustrated in FIG. 4*a*.
Figure 6:
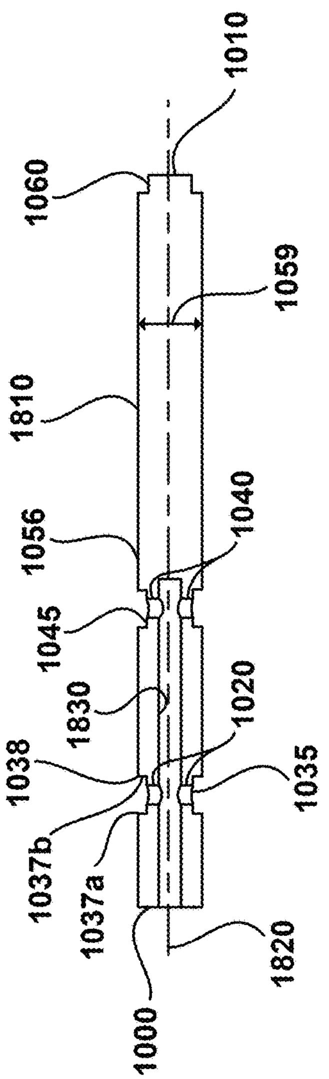
FIG. 6 is a cross-sectional view of a valve member of the liquid-fluid regulator of FIG. 4*a*.

With reference to FIGS. 4*a* and 6, valve member 1810, which can also be referred to as a needle or a plunger or a piston, is described in more detail. Bore 1830 defined by an annular inner surface of valve member 1810 extends along longitudinal axis 1820 from end 1000 of valve member 1810 towards and ending before opposite end 1010 of valve member 1810; that is, bore 1830 is a blind bore. Bore 1020 extends substantially radially (with respect to longitudinal axis 1820 of valve member 1810 in the illustrated embodiment) between an annular bore wall of blind bore 1830 and inner wall of first annular groove 1035 which is formed in outer surface 1056 of valve member 1810. Although bore 1020 is illustrated as a cross-drilled bore it is not required to pass through from one side of outer surface 1056 of valve member 1810 through to the other side of outer surface 1056. In other embodiments there could be other bores, including cross-drilled bores, angularly spaced apart with respect to longitudinal axis 1820 from bore 1020. In still other embodiments first annular groove 1035 is not required such that bore 1020 extends between outer surface 1056 of valve member 1810 and bore wall of blind bore 1830. With further reference to FIG. 4*b*, first annular groove 1035 formed in outer surface 1056 of valve member 1810 is further defined by first and second annular sidewalls 1037*a* and 1037*b*, respectively, and first and second annular edges 1038*a* and 1038*b*, respectively. Another bore 1040 shown as extending radially in the illustrated embodiment between the bore wall of longitudinal blind bore 1830 and inner wall of second annular groove 1045 formed in outer surface 1056 of valve member 1810 where second annular groove 1045 is located further away from first end 1000 of valve member 1810 than first annular groove 1035. Although bore 1040 is illustrated as a cross-drilled bore it is not required to be, and in other embodiments there could be other bores, including cross-drilled bores, angularly spaced apart with respect to longitudinal axis 1820 from radial bore 1040. In still other embodiments, second annular groove 1045 is not required such that bore 1040 extends to outer surface 1056 of valve member 1810. Reduced-diameter portion 1060 at or near opposite end 1010 of valve member 1810 is employed as a spring retainer for spring 910 (seen in FIG. 4*a*) that radially positions spring 910 with respect to longitudinal axis 820 within enlarged second diameter bore portion 900 of bore 830.

Referring again to FIG. 5, annular groove 845 in regulator body 810 is not required and instead, in other embodiments, outlet bore 940 can extend between bore wall 836 of bore 830 formed in regulator body 810 and liquid-fuel outlet receptacle 842. With reference to FIGS. 4*a*, 5 and 6, in those embodiments when annular grooves 845 and 1035 are not employed, the diameter and position of outlet bore 940 is such that there is a fluid communication path between bore 1020 of valve member 1810 and outlet bore 940 of regulator body 810 when these bores overlap along longitudinal axis 820 no matter the angular orientation of valve member 1810 around longitudinal axis 820 within bore 830, such that when valve 800 is opened (as will be explained in more detail below) there will be direct fluid communication between radial bore 1020 of valve member 1810 and radial bore 940 of regulator body 810.

Referring now to FIGS. 1, 4*a*, and 5, liquid-fuel regulator 260 is coupled with conduit 130 (seen in FIG. 1) through a fluid coupling, gaseous-fuel coupling 1370, (seen in FIG. 4*a*) that is threadedly received by gaseous-fuel receptacle 862 such that sealing surface 1386 of the gaseous-fuel coupling abuts against and fluidly seals with sealing surface 960 of the gaseous-fuel receptacle forming annular fluid seal 1384. Sealing surface 1386 is in the form of a mutually engaging and complimentary surface compared to sealing surface 960. In those applications requiring high pressure sealing (for example greater than 100 bar) the metal-to-metal sealing technique disclosed in Applicant's United States patent application having Publication No. 2017/0350357 A1 can be employed between all components requiring a high-pressure sealing interface. Gaseous-fuel port passageway 1380, through gaseous-fuel coupling 1370, is in fluid communication with second-fluid pressure sensing chamber 968 in bore 830 formed in regulator body 810, and with gaseous-fuel rail 120 (seen in FIG. 1) through conduit 130. Although an opposite side of gaseous-fuel coupling 1370 is not illustrated, it can be similar to the illustrated male-connection type or can be a female-connection type, and the opposite side connects to and fluidly seals with conduit 130 in the illustrated embodiment, or directly with gaseous-fuel rail 120 in other embodiments, such as through a coupling or fitting. End 1375 of gaseous-fuel coupling 1370 (seen in FIG. 4*a*) includes recessed portion 1395 that serves as a spring retainer for spring 910 that radially positions spring 910 with respect to longitudinal axis 820 of bore 830 of regulator body 810. Liquid-fuel regulator 260 is coupled to conduit 230 (seen in FIG. 1) through liquid-fuel inlet coupling 2370 (seen in FIG. 4*a*) that is threadedly received by liquid-fuel inlet receptacle 852 such that sealing surface 2386 of the liquid-fuel inlet coupling abuts against and fluidly seals with sealing surface 950 of the liquid-fuel regulator body forming annular fluid seal 2384. Sealing surface 2386 is in the form of a mutually engaging and complimentary surface compared to sealing surface 950. Liquid-fuel inlet passageway 2380, through liquid-fuel inlet coupling 2370, is in fluid communication with first-fluid pressure sensing chamber 958 in bore 1830 of valve member 1810 (seen in FIG. 4*a*) and with liquid-fuel rail 220 (seen in FIG. 1) through conduit 230 and shut-off valve 255. Although an opposite side of liquid-fuel inlet coupling 2370 is not illustrated, it can be similar to the illustrated male-connection type or can be a female-connection type, and the opposite side connects to and fluidly seals with conduit 230, such as through a coupling or fitting. Annular fluid seals 1384 and 2384 are capable of sealing high pressure fluids in an exemplary embodiment, for example fluid pressures of 500 bar and even higher. Liquid-fuel regulator 260 is coupled to conduit 240 (seen in FIG. 1) through liquid-fuel outlet coupling 2470 (seen in FIG. 4*a*) that is threadedly received by liquid-fuel outlet receptacle 842 such that annular fluid seal 2444 is formed when annular sealing member 2440 is compressed between liquid-fuel outlet coupling 2470 and annular sealing surface 846 in liquid-fuel outlet receptacle 842. Liquid-fuel outlet passageway 2480 extends through liquid-fuel outlet coupling 2470 such that it is in fluid communication with outlet bore 940 in regulator body 810 and with liquid-fuel drain 250 (seen in FIG. 1). Although an opposite side of liquid-fuel outlet coupling 2470 is not illustrated, it can be similar to the illustrated male-connection type or can be a female-connection type, and the opposite side connects to and fluidly seals with conduit 240 in the illustrated embodiment, or directly with liquid-fuel drain 250 in other embodiments, such as through a coupling or fitting. Annular fluid seal 2444 seals against a pressure that is relatively low pressure compared to the sealing pressure at fluid seals 1384 and 2384 since liquid-fuel outlet passageway 2480 is in fluid communication with liquid-fuel drain 250; that is; at a substantially lower pressure compared to liquid-fluid rail 220 and gaseous-fluid rail 120.

Referring again to FIG. 4*a*, in an exemplary embodiment, liquid-fuel inlet coupling 2370 and gaseous-fuel coupling 1370 include set screws 2360 and 1360 respectively. Set screw 2360 adjustably sets a hard stop position for end 1000 of valve member 1810 and includes a hollow core such that liquid-fuel inlet passageway 2380 extends therethrough. In other embodiments, instead of set screw 2360 the hard stop position for valve member 1810 can be set by the position of liquid-fuel inlet coupling 2370 or by a shelf (not shown) formed within bore 830 of regulator body 810. Before discussing set screw 1360, it is noteworthy that spring 910 determines in part the differential pressure between the liquid-fuel rail pressure in liquid-fuel rail 220 and the gaseous-fuel rail pressure in gaseous-fuel rail 120. The differential pressure is also determined based on an area difference between a liquid-fuel area of valve member 1810 exposed to first-fluid pressure sensing chamber 958 on which the liquid fuel is acting and creating a liquid-fuel force moving the valve member towards gaseous-fuel receptacle 862 and a gaseous-fuel area of valve member 1810 exposed to second-fluid pressure sensing chamber 968 on which the gaseous fuel is acting and creating a gaseous-fuel force moving the valve member towards liquid-fuel inlet receptacle 852. Set screw 1360 adjustably preloads spring 910 against valve member 1810 thereby providing the ability to adjust the differential pressure between the liquid-fuel pressure in liquid-fuel rail 220 and the gaseous-fuel pressure in gaseous-fuel rail 120. Set screw 1360 has a hollow core such that gaseous-fuel port passageway 1380 extends therethrough. In other embodiments, instead of employing set screw 1360 a fixed pre-load on spring 910 can be set by gaseous-fuel coupling 1370. In still further embodiments, spring 910 is not required such that the bias pressure between the liquid fuel and the gaseous fuel is determined based on the area difference between the liquid-fuel area and the gaseous-fuel area discussed above.

Referring again to FIGS. 4*a*, 5 and 6, outer diameter 1059 (seen in FIG. 6) of valve member 1810 is sized with respect to inner diameter 839 (seen in FIG. 5) of first longitudinal bore 830 (defined by a first bore wall 836 which is an inner surface of regulator body 810) such that when valve member 1810 is disposed within first longitudinal bore 830, annular match fit 924 and annular match fit 922 (both seen in FIG. 4*a*) are formed by the overlap between outer surface 1056 of valve member 1810 and first bore wall 836 of first longitudinal bore 830. Annular match fits 822, 824 and 924 restrict the flow of the liquid fuel from liquid-fuel inlet passageway 2380 therebetween. The liquid fuel from liquid-fuel rail 220 flows through liquid-fuel inlet passageway 2380 of liquid fuel inlet coupling 2370 and a passageway formed by valve member longitudinal bore 1830 and valve member radial bore 1040 and into valve member second annular groove 1045 where it flows around the groove and into annular match fits 922 and 924, where the liquid-fuel is flow restricted, forming liquid ring-seal 825 (seen in FIG. 4*a*). Liquid ring-seal 825 reduces and preferably prevents the flow of the gaseous fuel from gaseous-fuel port passageway 1380 from flowing into annular groove 845 and through bore 940 out of liquid-fuel regulator 260 through liquid-fuel outlet passageway 2480. Annular match fits 922 and 924 restrict fluid flow for all possible positions of valve member 1810 within bore 830 during operation. The liquid fuel within annular match fits 922 and 924 also serves to lubricate the wall of bore 830 improving the ability of valve member 1810 to move and slide within the bore. Annular match fit 822 formed between outer surface 1056 of valve member 1810 and bore wall 836 of first longitudinal bore 830 acts as a valve-member guide to improve the radial position of valve member 1810 and the accuracy of regulating valve 800, although in other embodiments, annular match fit 822 is not required.

Figure 7A:
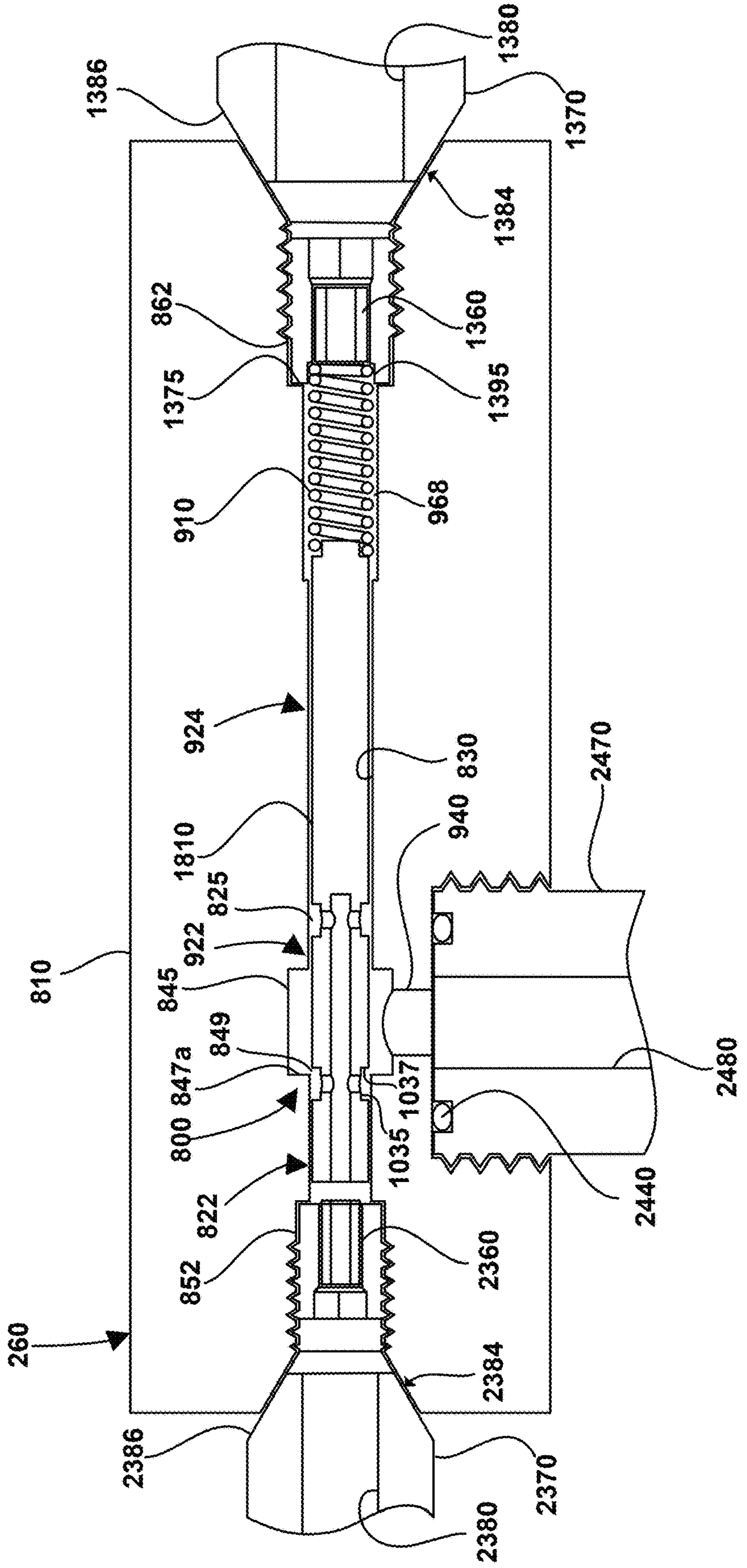
FIG. 7*a* is a cross-sectional view of the liquid-fluid regulator of FIG. 4*a* illustrated in an open position.
Figure 7B:
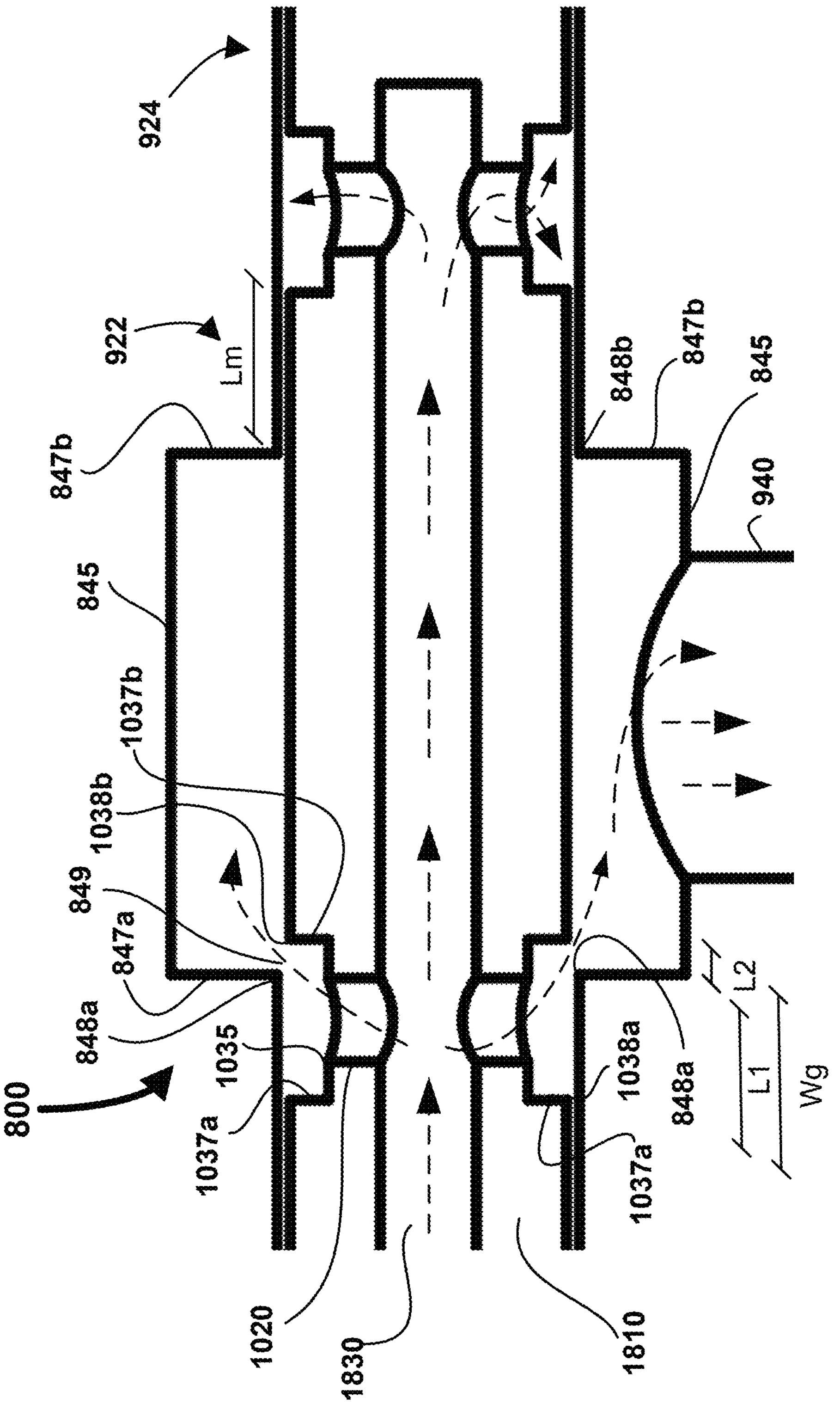
FIG. 7*b* is a portion of the liquid fluid regulator illustrated in FIG. 7*a*.

Regulating valve 800 is illustrated in a closed position in FIG. 4*a*, where annular match fit 824 restricts fluid flow through the regulating valve. Annular match fit 824 is formed from overlap between outer surface 1056 of valve member 1810 and bore wall 836 of bore 830 formed in regulator body 810. In general, regulating valve 800 has a range of closed positions as valve member 1810 moves through a range of overlap positions defined by the presence of a first annular match fit 824 where in the closed position a cross-sectional flow area through regulating valve 800 is below a predetermined level. In an exemplary embodiment the cross-sectional flow area through regulating valve 800 is substantially constant in the range of closed positions such that the range of closed positions can effectively be called the closed position. As valve member 1810 moves through the range of closed positions the axial length Lm (seen in FIG. 4*b*) of match fit 824 (with respect to longitudinal axis 820) changes. FIG. 4*b* shows an enlarged portion of regulator 260 shown in FIG. 4*a* with valve member 1810 in one overlap position of a range of possible overlap positions in which match fit 824 has match fit length Lm. Dash-lined arrows convey the flow of fluid through an inlet passageway formed in valve member 1810 by bores 1830 and 1020 and annular groove 1035. In an exemplary embodiment, match fit 824 provides a constant flow area through the regulating valve through the range of overlap positions, although this is not a requirement. In the closed positions (that is, the range of overlap positions in which length Lm of match fit 824 is greater than zero) the inlet passageway formed in valve member 1810 by bores 1830 and 1020 and annular groove 1035 is in indirect fluid communication through match fit 824 with an outlet passageway formed in regulator body 810 by annular groove 845 and bore 940. As valve member 1810 slidably moves towards the right in the illustrated embodiment, length Lm of match fit 824 will decrease such that the match fit disappears when second groove sidewall 1037*b* and second groove edge 1038*b* of groove 1035 (closest to a first groove sidewall 847*a* and first groove edge 848*a* of groove 845) transversely aligns with and then moves beyond first groove sidewall 847*a* of groove 845. Regulating valve 800 is illustrated in an open position in FIG. 7*a* and FIG. 7*b*, where match fit 824 is not present and where in the open position the cross-sectional flow area through regulating valve 800 is equal to or above the predetermined level. In general, regulating valve 800 has a range of open positions as valve member 1810 moves through a range of zero-overlap positions defined by zero overlap between that portion of outer surface 1056 of valve member 1810 that formed match fit 824 with regulator body bore wall 836 of bore 830. As valve member 1810 continues to slidably move to the right in the illustrated embodiment, regulating valve 800 has a variable cross-sectional flow area when opened such that as valve member 1810 moves through the range of open positions the cross-sectional flow area through regulating valve 800 changes, and as valve member 1810 moves through the range of open positions and further away from the closed position the cross-sectional flow area through regulating valve 800 increases. With reference to FIG. 7*b*, length L1 is the distance along axis 820 (seen in FIG. 4*a*) between first groove sidewall 1037*a* and second groove sidewall 847*a,* length L2 is the distance along axis 820 between second groove sidewall 1037*b* and first groove sidewall 847*a,* and groove width Wg is the width of annular groove 1035 along axis 820 between first groove sidewall 1037*a* and second groove sidewall 1037*b*. In the illustrated embodiment, when opened, the flow area through regulating valve 800 increases as second groove sidewall 1037*b* of annular groove 1035 in valve member 1810 moves further away (that is, to the right as referenced by length L2 in FIG. 7*b*) from first groove sidewall 847*a* and first groove edge 848*a* of annular groove 845 in regulator body longitudinal bore 830. In the embodiment illustrated, as groove 1035, having a groove width as indicated by Wg in FIG. 7*b*, slidably moves to the right, length L1 decreases and the flow area of the valve opening (as may be measured by length L2) increases. The flow area through regulating valve 800 is relatively substantially greater in any open position than in any closed position. In the opened positions of regulating valve 800, the inlet passageway formed in valve member 1810 by bores 1830 and 1020 and annular groove 1035 (seen in FIG. 6 and FIG. 7*b*) is in direct fluid communication with the outlet passageway 840 formed in regulator body 810 by annular groove 845 and bore 940. In other embodiments, it is possible that either or both valve member 1810 and first longitudinal bore 830 have a tapered profile such that when regulating valve 800 is closed and as valve member 1810 moves towards the open positions the flow area through match fit 824 into annular groove 845 increases but at a much smaller rate compared to the rate of increase of the flow area in the open positions.

In operation, when the differential pressure between the liquid-fuel pressure in liquid-fuel rail 220 and the gaseous-fuel pressure in gaseous-fuel rail 120 is too large, the liquid-fuel pressure pushes valve member 1810 in a direction to increase the flow area through regulating valve 800 to increase the mass flow rate of the liquid fuel in liquid-fuel rail 220 to liquid-fuel drain 250. When the differential pressure is too low, the gaseous-fuel pressure pushes the valve member 1810 in a direction to decrease the flow area through regulating valve 800 to reduce the mass flow rate of the liquid fuel from liquid-fuel rail 220 into liquid-fuel drain 250.

Figure 8:
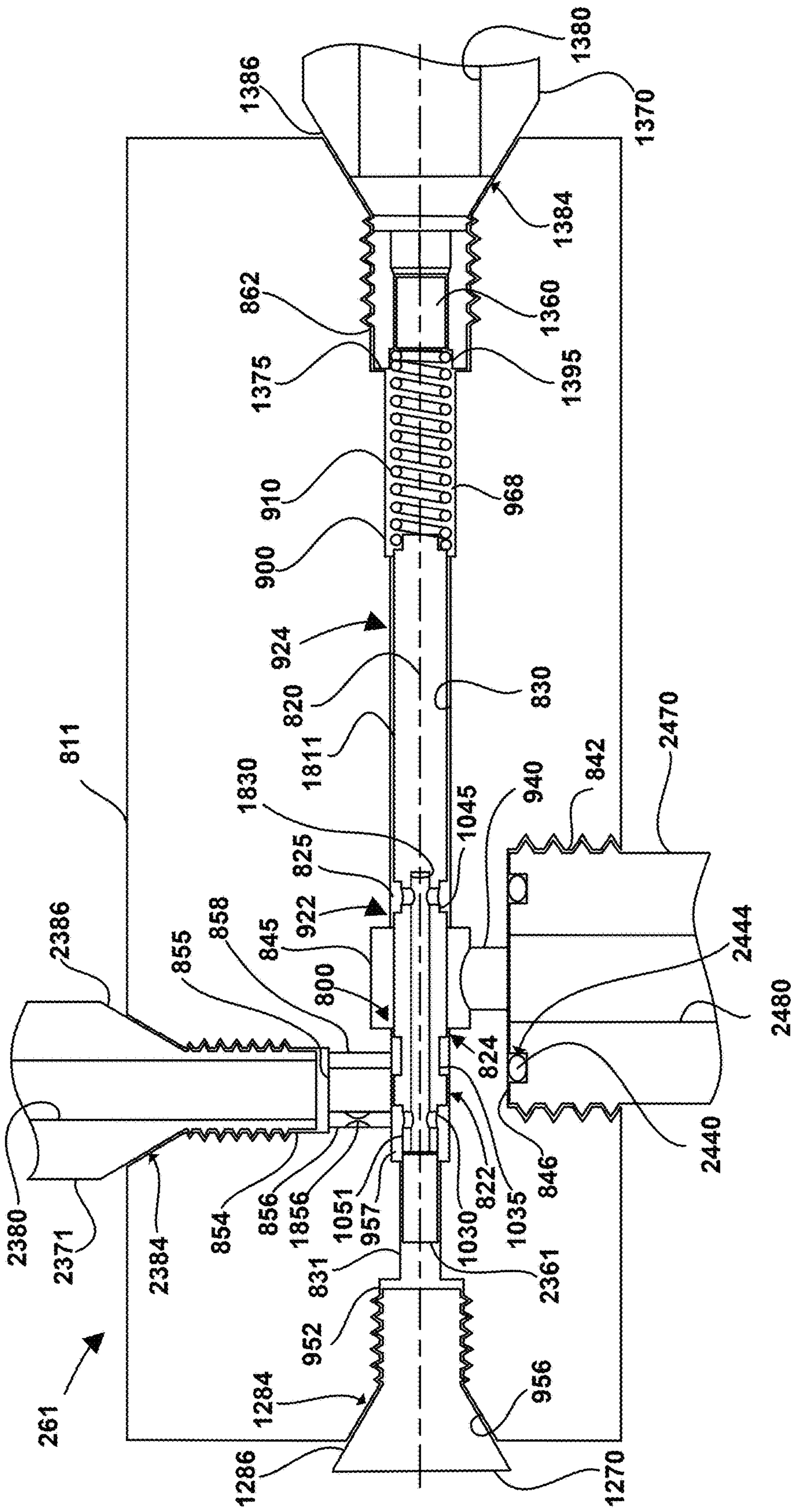
FIG. 8 is a cross-sectional view of an alternate embodiment of a liquid-fluid regulator illustrated in a closed position of the dual-fluid system of FIG. 1.
Figure 9:
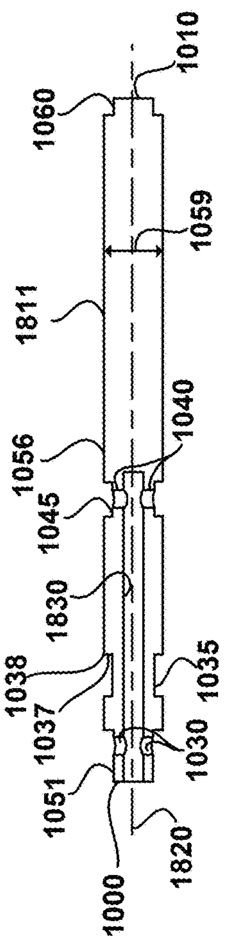
FIG. 9 is a cross-sectional view of a valve member of the liquid-fluid regulator of FIG. 8.

Referring now to FIG. 8, liquid-fuel regulator 261 is illustrated in another embodiment where like parts to previous embodiments and amongst all embodiments disclosed herein have like reference numerals and will not necessarily be described in more detail. Liquid-fuel inlet receptacle 854 is positioned in regulator body 811 radially with respect to longitudinal axis 820. Liquid-fuel inlet coupling 2371 is similar to coupling 2370 except that it does not have a set screw therein. Set screw 2361 is threadedly received in bore 831 and performs the same function as set screw 2360 seen in FIG. 4*a*; that is, it sets a hard-stop location for valve member 1811. Bore 831 is co-axial with and has a smaller diameter than bore 830, and in this regard could be considered a portion of bore 830 with reduced diameter. Plug 1270 is threadedly received into receptacle 952 such that annular fluid seal 1284 is formed between sealing surface 1286 of plug 1270 and sealing surface 956 of receptacle 952. In the illustrated embodiment, plug 1270 is removable from receptacle 952 in order to adjust set screw 2361. Bore 856 extends through regulator body 811 between receptacle end 855 of liquid-fuel inlet receptacle 854 and first-fluid pressure sensing chamber 957 located in bore 830 around end 1000 of valve member 1811 (seen in FIG. 9). Bore 856 can include restricted-flow orifice 1856 or can be sized such that it acts as a restricted-flow orifice. Restricted-flow orifice 1856 acts as a low pass filter between first-fluid pressure sensing chamber 957 and the upstream side of regulating valve 800, whereby sudden changes in flow through the regulating valve have a delayed effect on the fluid pressure in first-fluid pressure sensing chamber 957, such that the transient response of regulating valve 800 is more stable and improved. First-fluid pressure sensing chamber 957 primarily includes the annular portion of bore 830 adjacent set screw 2361 and reduced diameter portion 1051 of valve member 1811; however, other spaces within valve member 1811 and bore 830 in fluid communication with the above defined first-fluid pressure sensing chamber, without substantial flow restriction, can be considered part of the sensing chamber as well, such as bores 1830, 1030 and 1040 and second annular groove 1045 (best seen in FIG. 9). Bore 858 extends radially through regulator body 811 between receptacle end 855 of liquid-fluid inlet receptacle 854 and longitudinal bore 830 such that bore 858 is in fluid communication with annular groove 1035 and regulating valve 800. Valve member 1811 is similar to valve member 1810 (seen in FIG. 6) except that valve member 1811 does not have bore 1020 (seen in FIG. 6) extending from annular groove 1035 to bore 1830, and includes reduced diameter portion 1051 at end 1000 of valve member 1811 and bore 1030 extending radially from an outer surface of reduced diameter portion 1051 to bore 1830. Liquid fuel from liquid-fuel inlet passageway 1020 enters both first-fluid pressure sensing chamber 957 (through bore 856) and annular groove 1035 (through bore 858) radially with respect to longitudinal axis 820 and valve member 1811. An advantage of liquid-fuel regulator 261 compared to liquid-fuel regulator 260 (seen in FIG. 4*a*) is that it is more stable under transient conditions as regulating valve 800 adjusts. The reason for this improved stability is due to two factors. First, the liquid-fuel that flows from liquid-fuel inlet passageway 2380 through regulating valve 800 does not flow through first-fluid pressure sensing chamber 957. Secondly, restricted-flow orifice 1856 in bore 856 between first-fluid pressure sensing chamber 957 and regulating valve 800 acts as a low-pass filter to filter any high(er) frequency pressure fluctuations in the liquid-fuel pressure in liquid-fuel inlet passageway 2380. Due to these factors first-fluid pressure sensing chamber 957 is exposed to less liquid-fuel pressure fluctuations or noise as regulating valve 800 spills fuel from liquid-fuel inlet passageway 2380 to liquid-fuel outlet passageway 2480. As a result, valve member 1811 more accurately senses a pressure difference between liquid-fuel pressure in liquid-fuel rail 220 (seen in FIG. 1) and gaseous-fuel pressure in gaseous-fuel rail 120 (seen in FIG. 1) such that the operation of liquid-fluid regulator 261 is more stable in steady-state and transient conditions.

Figure 10:
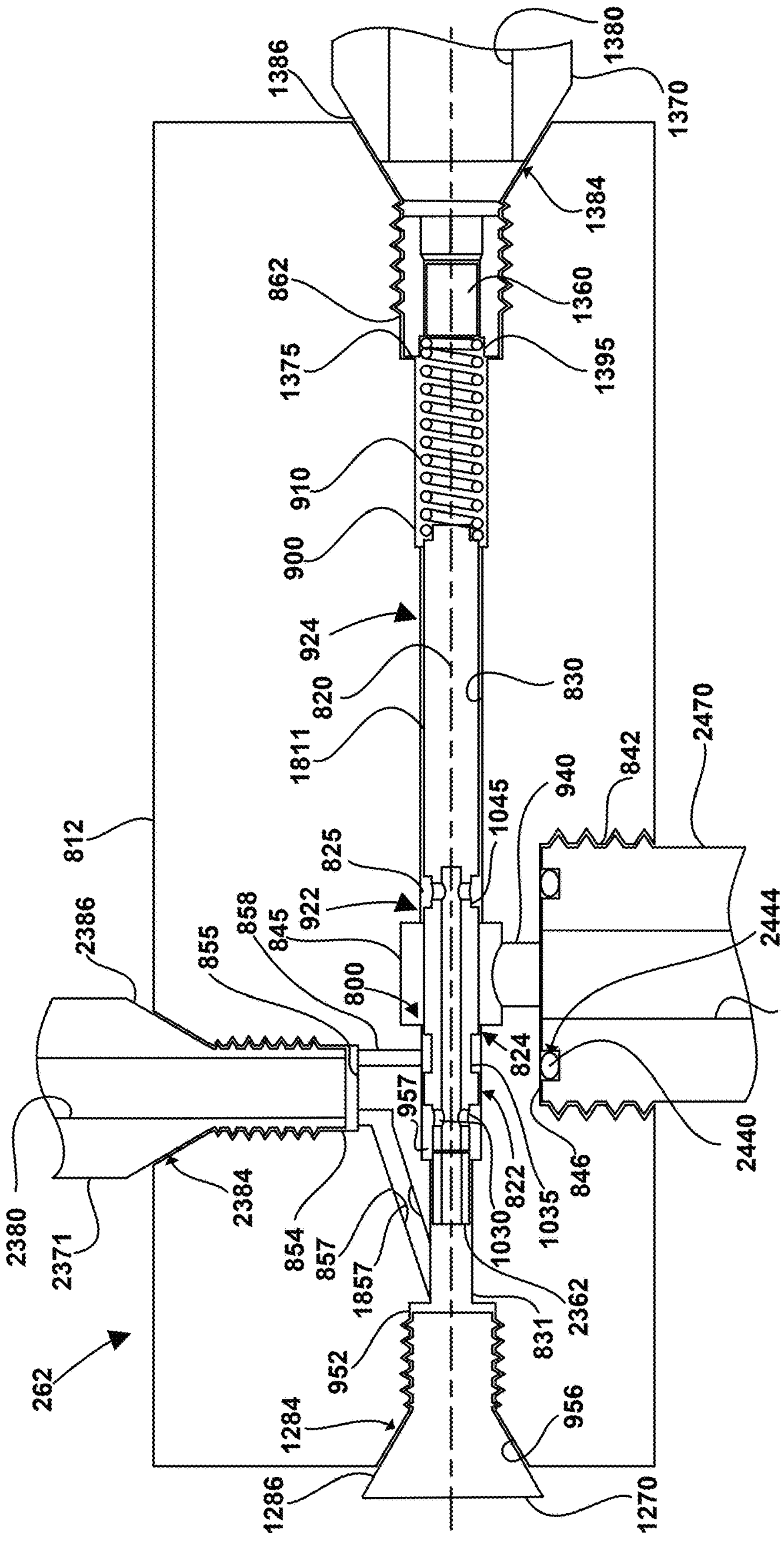
FIG. 10 is a cross-sectional view of an alternate embodiment of a liquid-fluid regulator illustrated in a closed position of the dual-fluid system of FIG. 1.

Referring now to FIG. 10, liquid-fuel regulator 262 is illustrated in another embodiment. Liquid-fuel inlet receptacle 854 is positioned in regulator body 812 radially with respect to longitudinal axis 820. Passageway 857 extends through regulator body 812 between end 855 of first-fluid inlet receptacle 854 and longitudinal bore 831. In the illustrated embodiment, passageway 857 includes two intersecting bores; however, this is not a requirement and in other embodiments passageway 857 can include, for example only, a single bore. Passageway 857 can include restricted-flow orifice 1857 (that serves the same function as restricted-flow orifice 1856), or can itself be sized to act as a restricted-flow orifice. Passageway 857 opens into bore 831 between plug 1270 and cylindrical set screw 2362, such that liquid fuel can flow from liquid-fuel inlet passageway 2380 through channel 857, bore 831, set screw 2362 into first-fluid pressure sensing chamber 957. Liquid-fuel regulator 262 has the same advantage discussed above for liquid-fuel regulator 261 (seen in FIG. 8), which is improved stability compared to liquid-fuel regulator 260 (seen in FIG. 4*a*) since the liquid-fuel that flows through regulating valve 800 does not flow through first-fluid pressure sensing chamber 957, and restricted-flow orifice 1857 acts as a low-pass filter to filter high(er) frequency pressure fluctuations in liquid-fuel inlet passageway 2380. Liquid-fuel regulator 262 can be considered even more stable than liquid-fuel regulator 261 since the liquid-fuel enters first-fluid pressure sensing chamber 957 longitudinally along bore 830 (seen in FIG. 10). In the embodiment of liquid-fuel regulator 261 seen in FIG. 8, the liquid-fuel enters first-fluid pressure sensing chamber 957 radially along bore 856 where radial forces of the liquid-fuel acting upon valve member 1811 may cause the valve member to move radially, which may reduce the valve members ability to move longitudinally when responding to the differential pressure between the first and second fluid pressure sensing chambers 957 and 968.

Figure 11:
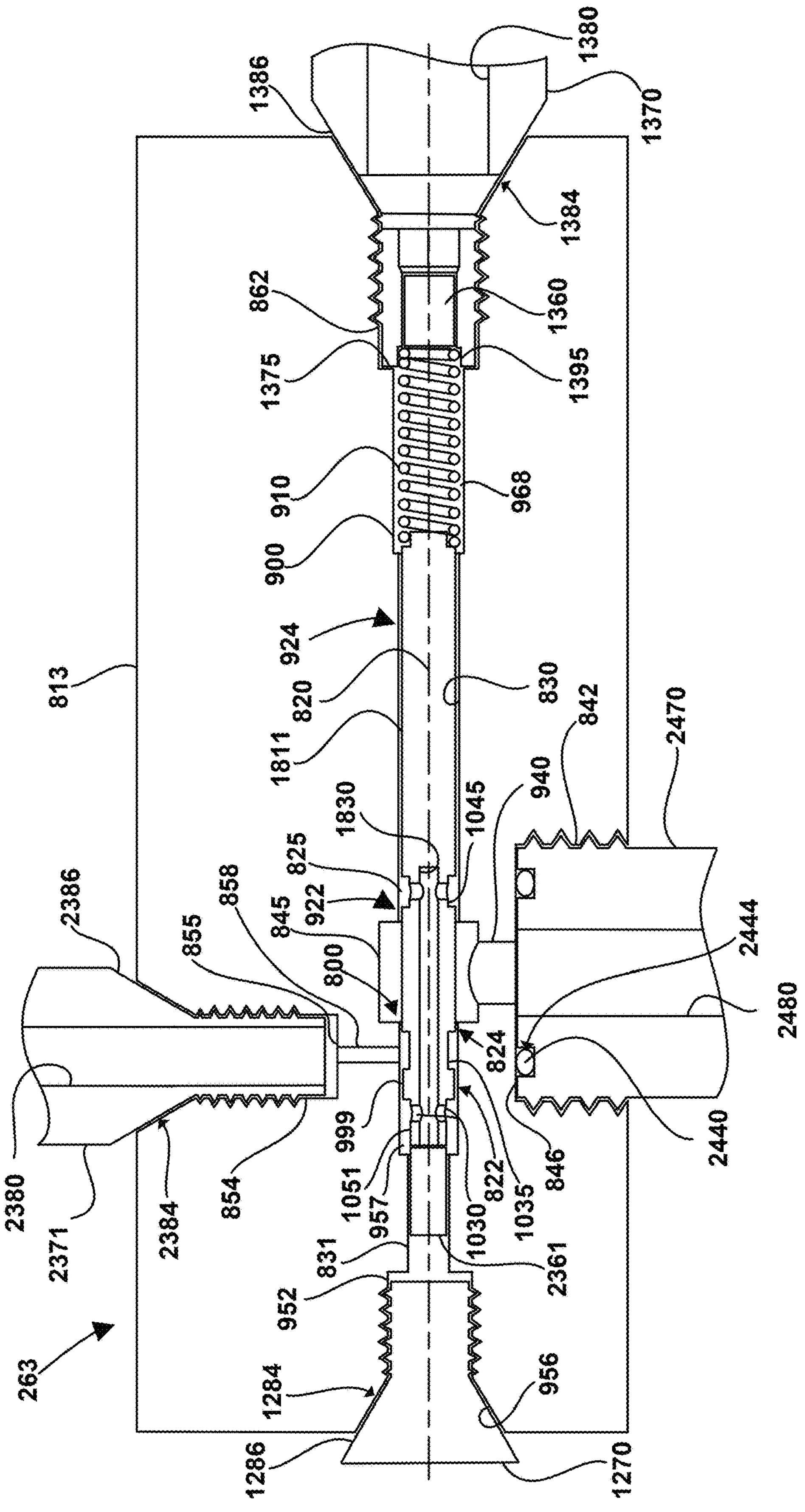
FIG. 11 is a cross-sectional view of an alternate embodiment of a liquid-fluid regulator illustrated in a closed position of the dual-fluid system of FIG. 1.

Referring now to FIG. 11 liquid-fuel regulator 263 is illustrated in another embodiment. Annular match fit 822 is sized by controlling an outer diameter of valve member 1811 to provide restricted-flow annulus 999 between valve member 1811 and first longitudinal bore 830 that operates similarly to restricted-flow orifices 1856 and 1857 in FIGS. 8 and 10 respectively as a low pass filter between first-fluid pressure sensing chamber 957 and the upstream side of regulating valve 800. In the illustrated embodiment of FIG. 11 the fluid flow through restricted-flow annulus 999 controls the fluid pressure in first-fluid pressure sensing chamber 957, in conjunction with the position of valve member 1811. Regulator body 813 is different than regulator body 811 and 812 in FIGS. 8 and 10 by eliminating bores 856 (FIG. 8) and 857 (FIG. 10) between first-fluid inlet receptacle 854 and first-fluid pressure sensing chamber 957 and bore 831 respectively.

Figure 12:
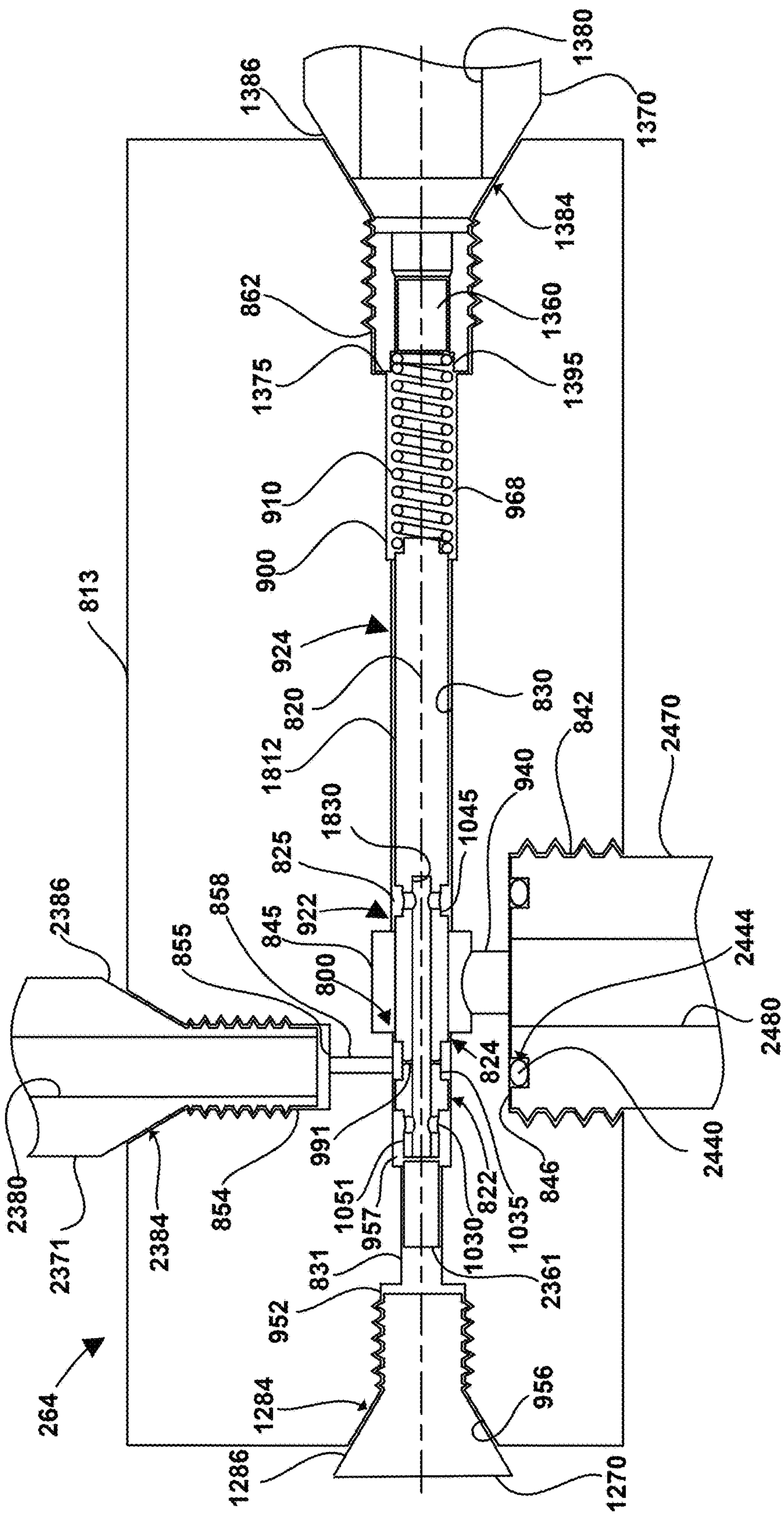
FIG. 12 is a cross-sectional view of an alternate embodiment of a liquid-fluid regulator illustrated in a closed position of the dual-fluid system of FIG. 1.
Figure 13:
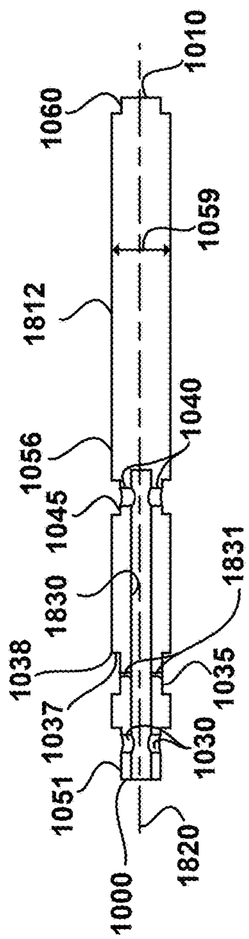
FIG. 13 is a cross-sectional view of a valve member of the liquid-fluid regulator of FIG. 12.

Referring now to FIGS. 12 and 13 liquid-fuel regulator 264 is illustrated in another embodiment. Restricted-flow orifice 1831 extends between annular groove 1035 and bore 1830 of valve member 1812, and functions similarly to restricted-flow orifices 1856 and 1857 and restricted annulus 999 in the previous embodiments of FIGS. 8, 10 and 11 respectively as a low pass filter between first-fluid pressure sensing chamber 957 and the upstream side of regulating valve 800. In the illustrated embodiment of FIG. 12 liquid-fuel flows from inlet passageway 2380 through restricted-flow orifice 1831 and bores 1830 and 1030 into first-fluid pressure sensing chamber 957. In other embodiments bore 1830 can operate as a restricted-fluid orifice that restricts the flow of fluid into and out of first-fluid pressure sensing chamber 957, and in these embodiments orifice 1831 does not restrict flow relative to bore 1830. In still further embodiments, bores 1030 and 1040 (best seen in FIG. 13) can be restricted-flow orifices, and in these embodiments orifice 1831 does not restrict flow relative to bores 1030 and 1040. When bore 1040 acts as a restricted-flow orifice it operates as a low pass filter for liquid ring-seal 825.

Figure 14:
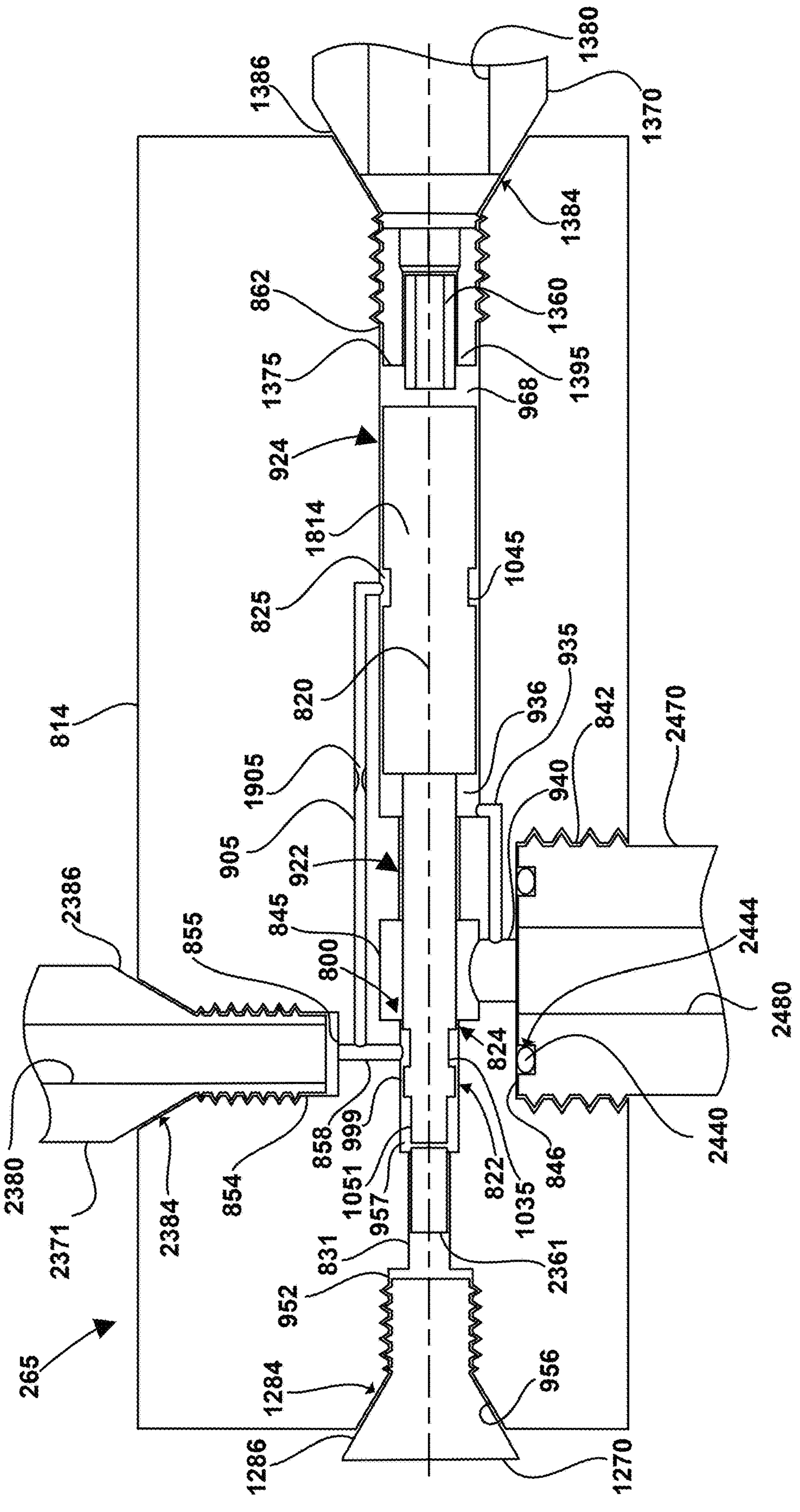
FIG. 14 is a cross-sectional view of an alternate embodiment of a liquid-fluid regulator illustrated in a closed position of the dual-fluid system of FIG. 1.
Figure 15:
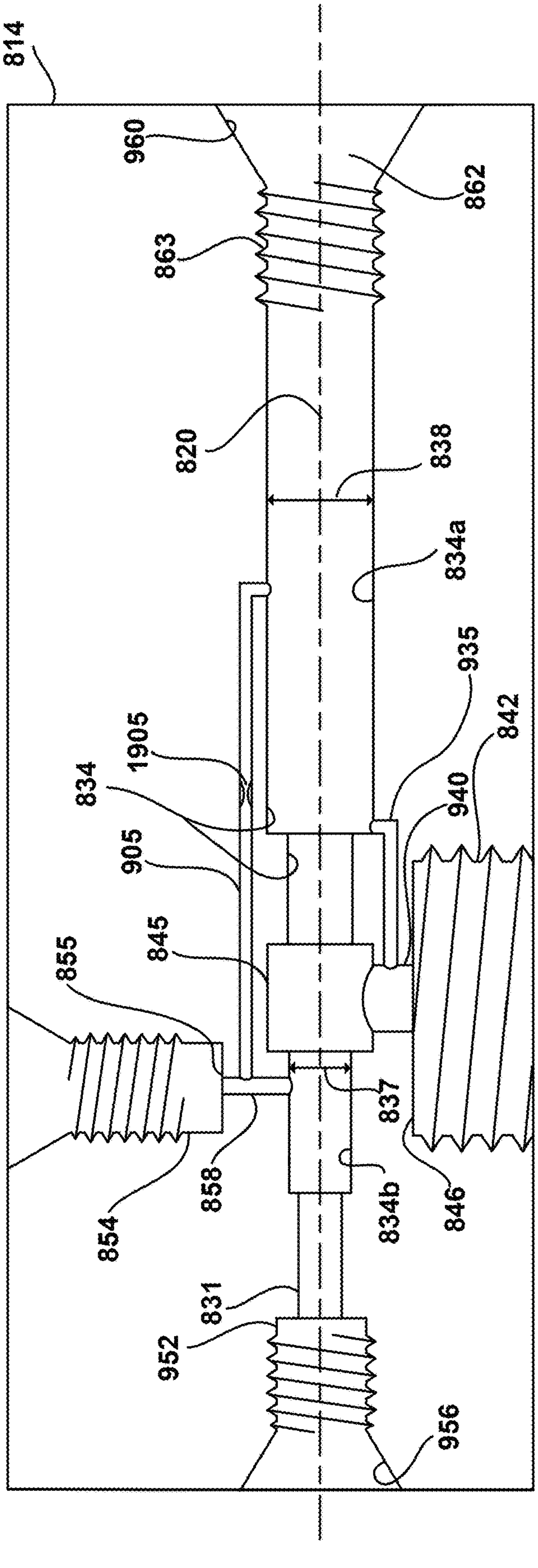
FIG. 15 is a cross-sectional view of a regulator body of the liquid-fluid regulator of FIG. 14.
Figure 16:
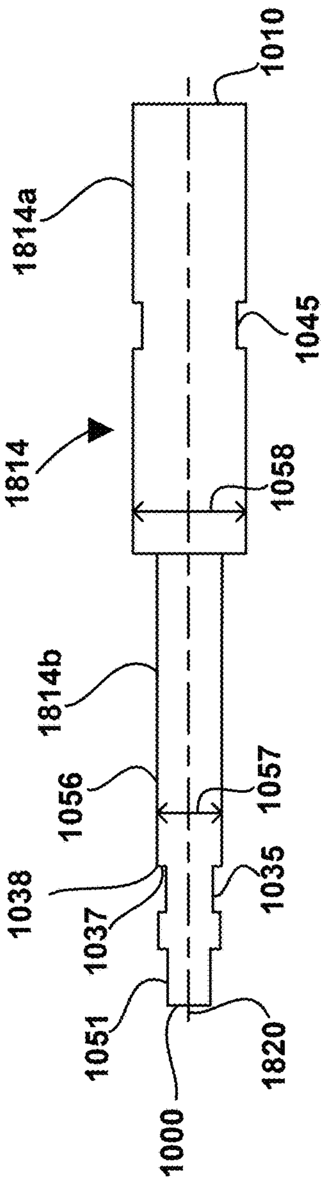
FIG. 16 is a cross-sectional view of a valve member of the liquid-fluid regulator of FIG. 14.

Referring now to FIGS. 14, 15 and 16 liquid-fuel regulator 265 is illustrated in another embodiment. Regulator body 814 includes stepped longitudinal bore 834 (best seen in FIG. 15) having first diameter section 834*a* and second diameter section 834*b* that receives stepped valve member 1814 having first diameter section 1814*a* and second diameter section 1814*b*. In the illustrated embodiment, first diameter sections 834*a*, 1814*a* have larger diameters 838, 1058 respectively than diameters 837, 1057 of second diameter sections 834*b* and 1814*b* respectively, although in other embodiments where different liquid fluids are employed instead of a liquid fluid and a gaseous fluid it is conceived that first diameter sections 834*a* and 1814*a* can have smaller diameters than second diameter sections 834*b* and 1814*b* (as will be explained in more detail below). Stepped valve member 1814 is shown as a unitary member; however, in other embodiments there can be two separate valve members that have different diameters, which abut each other, for example first diameter section 1814*a* can be a unitary member and second diameter section 1814*b* can be a unitary member, where first diameter section 1814*a* is separate and distinct from second diameter section 1814*b*. With reference to FIG. 16, surface area of second end 1010 of valve member 1814 is greater than surface area of first end 1000 of valve member 1814 such that a force difference is established when a difference between a first force generated by gaseous-fuel pressure acting on second end 1010 and a second force generated by liquid-fuel pressure acting on first end 1000 is either less than or greater than a predetermined value. The difference in surface areas of ends 1010 and 1000 in the illustrated embodiment has the same effect as spring 910 in previous embodiments; that is; the difference in surface areas of ends 1010 and 1000 of valve member 1814 determines a predetermined differential pressure between liquid-fuel pressure and gaseous-fuel pressure that liquid-fuel regulator 265 is configured to maintain by spilling liquid-fuel from liquid-fuel inlet passageway 2380 to liquid-fuel outlet passageway 2480. Generally, liquid-fuel pressure is greater than gaseous-fuel pressure since a purpose of the liquid fuel is to seal the gaseous-fuel, and in this regard the surface area of second end 1010 is larger than the surface area of first end 1000 in order for the predetermined differential pressure (i.e. the system bias pressure) between liquid-fuel and gaseous-fuel is greater than zero. However, in other embodiments when the differential pressure between two liquids is being controlled it is conceivable that a surface area of second end 1010 can be smaller than a surface area of first end 1000. Channel 905 delivers liquid-fuel through restricted-flow orifice 1905 (acting as a low-pass filter) to liquid ring-seal 825. In general, any restricted-flow orifice in the present disclosure can be replaced by sizing the conduit containing the restricted-flow orifice accordingly. Channel 935 acts as a drain to evacuate any liquid fuel that spills into annular chamber 936 from liquid ring-seal 825 or from match fit 922 (note that when annular groove 845 and annular chamber 936 are at the same pressure there is no fluid flow through match fit 922). In the illustrated embodiment, match fit 922 acts as a guide bearing for valve member 1814 and is shown without a lubricating source, although it is conceived that match fit 922 can be lubricated by liquid-fuel in other embodiments supplied by a conduit through a restricted-flow orifice.

Figure 17:
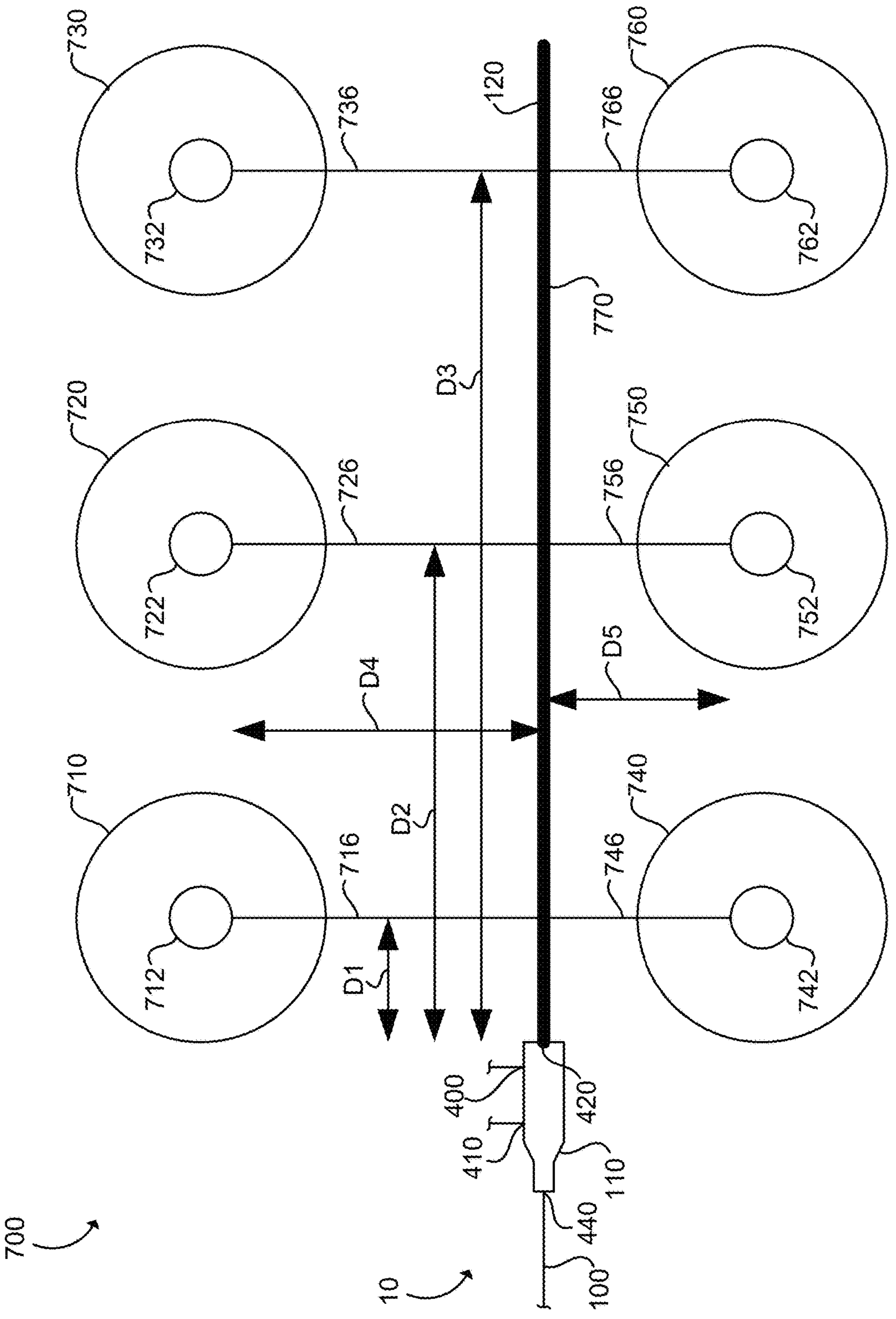
FIG. 17 is a schematic view of an engine arrangement illustrating distances between a gas rail injector and fuel injectors and their respective engine cylinders.

Referring now to FIG. 17, there is shown internal combustion engine 700 that employs dual-fuel system 10 of which rail injector 110 and gaseous-fuel rail 120 are illustrated and other parts of the dual-fuel system are not. Engine 700 includes six cylinders 710, 720, 730, 740, 750 and 760 in which respective pistons (not shown) reciprocate and dual-fuel injectors 712, 722, 732, 742, 752 and 762 are configured. In other embodiments, engine 700 can include less or more than six cylinders. Dual-fuel injectors 712, 722, 732, 742, 752 and 762 are similar to dual-fuel injector 20 seen in FIG. 1. Each dual-fuel injector 712, 722, 732, 742, 752 and 762 is connected to gaseous-fuel rail 120 by respective fuel lines 716, 726, 736, 746, 756 and 766. Other fluid or electrical connections to these injectors are not shown in FIG. 17, for example a fluid connection to liquid-fuel rail 220 and liquid-fuel drain 250, or a communication connection to control unit 300 by way of communication lines 350 and 352. In the illustrated embodiment the fluid-communication distance that the gaseous fuel from rail injector 110 must travel to reach each dual-fuel injector 712, 722, 732, 742, 752 and 762 is different, although it is not a requirement that the all fluid-communication distances are different, and in other embodiments, two or more of the fluid-communication distances may be equal. Fluid-communication distance D1 is the distance along gaseous-fuel rail 120 between gaseous-fuel outlet 420 of rail injector 110 and the connection point of fuel lines 716 and 746 with the gaseous-fuel rail, where fuel lines 716 and 746 connect at the same longitudinal point along the gaseous-fuel rail in the illustrated embodiment. It is not a requirement that two or more of the fuel lines connect at the same longitudinal point along gaseous-fuel rail 120 and in other embodiments, the longitudinal connection points can be different or unique for each fuel line. Fluid-communication distance D2 is the distance along gaseous-fuel rail 120 between gaseous-fuel outlet 420 and the connection point of fuel lines 726 and 756 with the gaseous-fuel rail, where fuel lines 726 and 756 connect at the same point along the gaseous-fuel rail in the illustrated embodiment. Fluid-communication distance D3 is the distance along gaseous-fuel rail 120 between gaseous-fuel outlet 420 and the connection point of fuel lines 736 and 766 with the gaseous-fuel rail, where fuel lines 736 and 766 connect at the same point along the gaseous-fuel rail in the illustrated embodiment. Fluid-communication distance D4 is the distance along fuel line 716, which is also equal to the distance along fuel lines 726 and 736 in the illustrated embodiment. It is not a requirement that any of the fuel lines 716, 726, 736, 746, 756 and 766 have equal lengths. Fluid-communication distance D5 is the distance along fuel line 746, which is also equal to the distance along fuel lines 756 and 766 in the illustrated embodiment. The fluid-communication distance that dual-fuel injector 712 is from rail injector 110 with respect to the fluid communication of the gaseous fuel is equal to the sum of distances D1 and D4. Similarly, the fluid-communication distance for dual-fuel injector 722 is equal to the sum of the distances of D2 and D4. The fluid-communication distance for dual-fuel injector 732 is equal to the sum of the distances of D3 and D4. The fluid-communication distance for dual-fuel injector 742 is equal to the sum of the distances of D1 and D5. The fluid-communication distance for dual-fuel injector 752 is equal to the sum of the distances of D2 and D5. The fluid-communication distance for dual-fuel injector 762 is equal to the sum of the distances of D3 and D5.

Whenever any one of the dual-fuel injectors 712, 722, 732, 742, 752 and 762 are actuated to inject gaseous fuel a pressure wave characterized by a leading trough is created that travels along the respective fuel line 716, 726, 736, 746, 756 and 766 towards, into and along gaseous-fuel rail 120. Similarly, when rail injector 110 is actuated a pressure wave characterized by a leading crest is created that travels along gaseous-fuel rail 120. The timing of actuating rail injector 110 can be coordinated with the timing of actuating each dual-fuel injector 712, 722, 732, 742, 752 and 762 based on the fluid-communication distance the dual-fuel injector is from the rail injector such that the pressure wave from the rail injector can meet the pressure wave of the dual-fuel injector at a selected location between injection valve 440 of the rail injector and an injection valve (not shown) of the dual-fuel injector such that the pressure waves either (1) cancel each other out and reduce pressure fluctuations along gaseous-fuel rail 120 or within the dual-fuel injector, or (2) combine to create an increased pressure above a mean pressure. For example, the pressure waves can meet at the connection point of the respective fuel line 716, 726, 736, 746, 756 and 766 with gaseous-fuel rail 120. Alternatively, the pressure waves can meet at a gaseous-fuel accumulator (not shown) within the respective dual-fuel injector, such that during the injection of the gaseous fuel into the respective cylinder, the change of pressure of the gaseous fuel near the injection valve of the dual-fuel injector is reduced, or if the crest of the pressure wave from rail injector 110 arrives at the accumulator before injection begins then the local pressure increases before injection. Reducing gaseous-fuel pressure decreases at the injection valve during injection is advantageous when a high(er) mean gaseous-fuel rail pressure is employed, and increasing gaseous-fuel pressure at the injection valve prior to injection is advantageous when a low(er) mean gaseous-fuel rail pressure is employed.

Gaseous-fuel rail volume 770 (FIG. 17) is the gaseous-fuel volume defined by gaseous-fuel rail 120, fuel lines 716, 726, 736, 746, 756 and 766, rail injector 110 and dual-fuel injectors 712, 722, 732, 742, 752 and 762. In the illustrated embodiment of FIG. 3, the gaseous-fuel volume in rail injector 110 is that volume downstream from injection valve 440 including gaseous-fuel annular passages 500 and 510. The gaseous-fuel volume within dual-fuel injectors 712, 722, 732, 742, 752 and 762 is that volume upstream of respective gaseous-fuel injection valves 28 (seen in FIG. 1) between the gaseous-fuel injection valve 28 and gaseous-fuel inlet 26 (seen in FIG. 1) including passages and conduits and possibly other volumes such as internal accumulators. Any gaseous-fuel mass flow into and out of the gaseous-fuel rail volume will create pressure waves travelling through-out the gaseous-fuel rail volume. For example, whenever any one of the dual-fuel injectors 712, 722, 732, 742, 752 and 762 are actuated to inject gaseous fuel into respective cylinders, thereby removing mass from gaseous-fuel rail volume 770, a pressure wave is created characterized by a leading trough that travels along the respective fuel line towards, into and along gaseous-fuel rail 120 and into the other fuel lines and reflecting off surfaces encountered along the way. Similarly, when rail injector 110 is actuated to inject gaseous fuel into gaseous-fuel rail volume 770, thereby adding mass to the gaseous-fuel rail volume, a pressure wave is created characterized by a leading crest that travels along gaseous-fuel rail 120 and into the fuel lines. As engine 700 operates a continuous series of the rail injector and dual-fuel injector pressure waves are created, and as these waves interact with each other within the gaseous-fuel rail volume the local pressure therein fluctuates. For example, when a crest of a first pressure wave interacts with a crest of a second pressure wave the local pressure increases at the point of interaction. The local pressure decreases at the point of interaction when a trough the first pressure wave interacts with a trough of the second pressure wave. When the crest of the first wave interacts with the trough of the second wave they will partially or completely cancel each other out such that the local pressure variation will be reduced or eliminated compared to the local pressure variation due to the crest or the trough taken alone.

There are three locations within gaseous-fuel rail volume 770 where the local pressure has increased temporal importance compared to other locations therein. A first location is at each gaseous-fuel injection valve on the upstream side within a respective nozzle of dual-fuel injectors 712, 722, 732, 742, 752 and 762, herein the dual-fuel-injector location, and the local pressure has increased importance at the time the dual-fuel injectors are injecting. It is desirable to have a local pressure that increases above the average pressure in gaseous-fuel rail volume 770 at the dual-fuel injector location, to increase injection pressure and therefore injection rate. Injection rate is determined by the differential pressure within the dual-fuel injector and the pressure in the cylinder when the injector is injecting. Increasing local pressure at the time of injection also allows the average pressure in gaseous-fuel rail volume 770 to be reduced, while still maintaining a desired injection rate, which reduces the work required from the cryogenic pump (not shown) that pumps the liquefied form of the gaseous fuel through the heat exchanger (not shown) to pressurized supply 60 (seen in FIG. 1). As an example, if the required local pressure at the first location (the dual-fuel-injector location) is 280 bar in order to achieve the desired injection rate, the average pressure in gaseous-fuel rail volume 770 can be 250 bar, and at the time of injection the local pressure can be increased to 280 bar by timing the arrival of a crest of a pressure wave at the time of injection. The parasitic energy savings for the system to have the cryogenic pump pressurize (indirectly) the gaseous-fuel rail volume 770 to 250 bar instead of 280 bar is significant, and the reliability cost of such a cryogenic pump is significantly lower than a cryogenic pump that must pressurize to 280 bar. In other embodiments the required local pressure at the first location can be within a range of 150 bar to 290 bar, and the average pressure in gaseous-fuel rail volume 770 can be within a range of 160 bar to 350 bar. In still further embodiments, the required local pressure at the first location can be within a range of 150 bar to 470 bar, and the average pressure in gaseous-fuel rail volume 770 can be within a range of 160 bar to 550 bar. As a further advantage, this technique allows an internal combustion engine to achieve desired emission and efficiency targets at a lower parasitic energy cost.

A second location where the local pressure has increased temporal importance is where pressure sensor 125 is measuring the pressure within gaseous-fuel rail volume 770, herein the pressure-sensor location, at the time of sampling of the pressure. It is desirable that the pressure-sensor sample an actual average pressure in gaseous-fuel rail volume 770 to avoid the delay associated with sampling the local pressure at the second location that has been modified, either up or down, by one or more pressure waves. For example, when the local pressure at the second location is not modified by one or more pressure waves then the pressure sampled is the average pressure in gaseous-fuel rail volume 770, and pressure sensor 125 (seen in FIG. 1) can measure the pressure in one sample and send the measurement value to control unit 300 (seen in FIG. 2) that can then use the measurement value in controlling the operation of the dual-fuel system and engine 700. Alternatively, when the local pressure is modified by one or more pressure waves then in order to determine the average pressure in gaseous-fuel rail volume 770 control unit 300 needs to receive a plurality of measurement values from pressure sensor 125 for a plurality of sample periods and then process these measurement values to mathematically determine the average pressure in the gaseous-fuel rail volume.

A third location where the local pressure has increased temporal importance is at the outlet of rail injector 110, herein the rail-injector location, and the local pressure has increased importance at the time the rail injector is injecting into gaseous-fuel rail volume 770. It is desirable to have a local pressure at the third location that is less than the average pressure in gaseous-fuel rail volume 770 to reduce the average pressure in pressurized supply 60 that is required to inject mass into the gaseous-fuel rail volume. This technique has advantages similar to those associated with the dual-fuel injector location, that is, energy savings by reducing the work required from the cryogenic pump and increased reliability and a lower cost.

The actuation of rail injector 110 is controlled by control unit 300 in order to achieve the desired local pressure conditions at the first, second and third locations. For example, the timing of injection of rail injector 110 and the mass that the rail injector injects can be modulated to achieve the desired local pressure. For each of the first, second and third locations, the timing of injection for and the mass injected by rail injector 110 can each be determined as a function of the distance the rail injector is from the first, second and third locations respectively. Additionally, the timing of injection for and the mass injected by rail injector 110 can each be determined as a function of the timing of injection for and the mass injected by each of dual-fuel injectors 712, 722, 732, 742, 752 and 762. Additional pressure sensors that sense the pressure at the first, second and third locations can be employed to send signals representative of the local pressure at the first, second and third locations to control unit 300 and the control unit can employ these local pressure measurements to determine the timing of the injections of rail injector 110.

Figure 18:
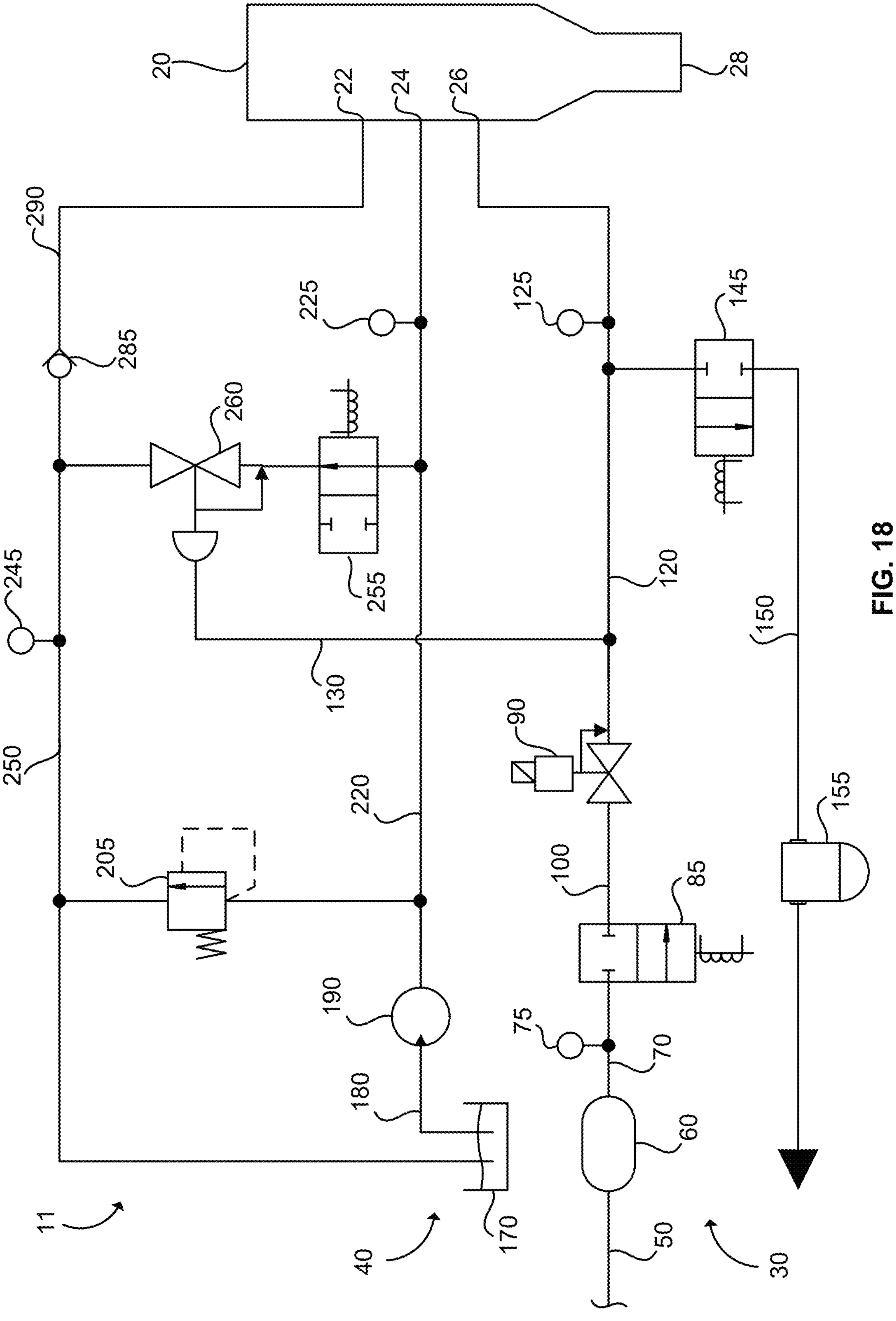
FIG. 18 is a schematic view of a dual-fuel system according to another embodiment.

Referring now to FIG. 18, there is shown dual-fluid system 11 that regulates both the pressure of the first fuel and the differential pressure between the second fuel and the first fuel, in addition to other functions, according to another embodiment. Electronic forward pressure regulator 90 regulates the gaseous-fuel rail pressure in gaseous-fuel rail 120 by varying a flow area through the regulator, depending upon the gaseous-fuel supply pressure in conduit 100, and upon the desired gaseous-fuel rail pressure. Electronic forward pressure regulator 90 includes a valve (not shown) having a variable flow area therethrough, and the valve can be balanced with respect to the gaseous-fuel supply pressure such that a solenoid that is employed to open the valve to a variable position does not need to act against the full force of the gaseous-fuel supply pressure acting on the valve, but merely against a spring that is employed to bias the valve to a closed position. This greatly reduces the size of the electromagnetics in pressure regulator 90. In operation the valve in pressure regulator 90 can be employed to create pressure waves similar to rail injector 110 by variably opening or closing the valve to create leading crest or leading trough pressure waves in gaseous-fuel rail 120.

Regulating valve 800 can be described as an edge valve or a curtain valve in the illustrated embodiments of FIGS. 4*a*-7*b*, 8-11, 12-13, and 14-16 where the opening of regulating valve 800 is like a curtain opening letting in light, and the greater the curtain opens more light is let in. With reference to FIGS. 4*a* and 4*b* (and similarly for the other embodiments of FIGS. 8-11, 12-13, and 14-16), regulating valve 800 can be considered to be closed when annular sidewall 1037*b* is radially overlapping annular sidewall 847*a* with respect to axis 820, or to the left of annular sidewall 847*a* (that is, annular sidewall 1037*b* is closer to liquid-fuel receptacle 852 than annular sidewall 847*a*), such that match fit 824 exists and a flow of liquid-fuel between liquid-fuel rail 220 and liquid-fuel drain 250 (seen in FIG. 1) is constrained by a cross-sectional flow area through match fit 824. With reference to FIGS. 7*a* and 7*b*, as annular sidewall 1037*b* moves to the right of annular sidewall 847*a* along axis 820 (that is, annular sidewall 1037*b* is closer to gaseous-fuel receptacle 862 than annular sidewall 847*a*) match fit 824 disappears and regulating valve 800 can be considered to be opened and in one of a plurality of open positions whereby the flow between liquid-fuel rail 220 and liquid-fuel drain 250 is constrained by a cross-sectional flow area through annular surface 849 (seen in FIG. 7*b*) between groove edge 1038*b* and groove edge 848*a*, and as annular sidewall 1037*b* moves increasingly to the right away from sidewall 847*a* the cross-sectional flow area through annular surface 849 increases. A valve gain can be defined as a ratio between the cross-sectional flow area through regulating valve 800 in the one of the plurality of open positions (defined by the cross-sectional flow area through surface 849) over the cross-sectional flow area through regulating valve 800 when closed (defined by the cross-sectional flow area through match fit 824). The valve gain can be adjustable over at least a portion of the plurality of open positions of regulating valve 800 where the valve gain increases as the flow area through annular surface 849 increases as annular sidewall 1037*b* moves further away from annular sidewall 847*a* towards gaseous-fuel receptacle 862. The valve gain of regulating valve 800 can be characterized as a function of a position of valve member 1810 along longitudinal axis 820 of longitudinal bore 830, where the valve gain varies between the closed position of regulating valve 800 where the cross-sectional flow area through regulating valve 800 is at a low value (defined by the cross-sectional flow area through match fit 824), and a fully open position of regulating valve 800 where the cross-sectional flow area through regulating valve 800 is at a high value (defined by the cross-sectional flow area through annular surface 849). The low value of the cross-sectional flow area through regulating valve 800 can be a minimum value and the high value of the cross-sectional flow can be a maximum value. Again, the cross-sectional flow area through annular surface 849 increases as valve member 1810 moves from the closed position towards the fully open position. In an exemplary embodiment the valve gain function is non-linear although this is not a requirement. In some circumstances the valve gain can increase substantially as valve member 1810 travels over a relatively short distance along longitudinal axis 820 such that a magnitude of a first derivative of the valve gain function can have relatively large values over that relatively short distance (that is, a rate of increase of the valve gain of regulating valve 800 relative to the position of vale member 1810 along axis 820 can be excessively large). Large changes in the valve gain over short distances of valve member 1810 along axis 820 can reduce the ability of regulating valve 800 to desirably regulate the differential pressure between the liquid fuel in liquid-fuel rail 220 and the gaseous fuel in gaseous-fuel rail 120 (seen in FIG. 1) and may lead to an undesirable response of a control system of regulating valve 800. For example, the undesirable response of the control system can be an undesired underdamped response, a marginally stable response, or an unstable response. In these circumstances a variety of features in regulating valve 800 can be employed to reduce the magnitude of the first derivative of the valve gain function (particularly over that relatively short distance of travel of valve member 1810 along longitudinal axis 820 where the valve gain increased substantially), which can have a stabilizing effect on the ability of regulating valve 800 to regulate the differential pressure. It is noted that the response of the control system of regulating valve 800 can be an undesirable overdamped response in those circumstances where the valve gain in the fully open position is too small or where the rate of increase of the valve gain is too small between the closed position and the fully open position.

Figure 19:
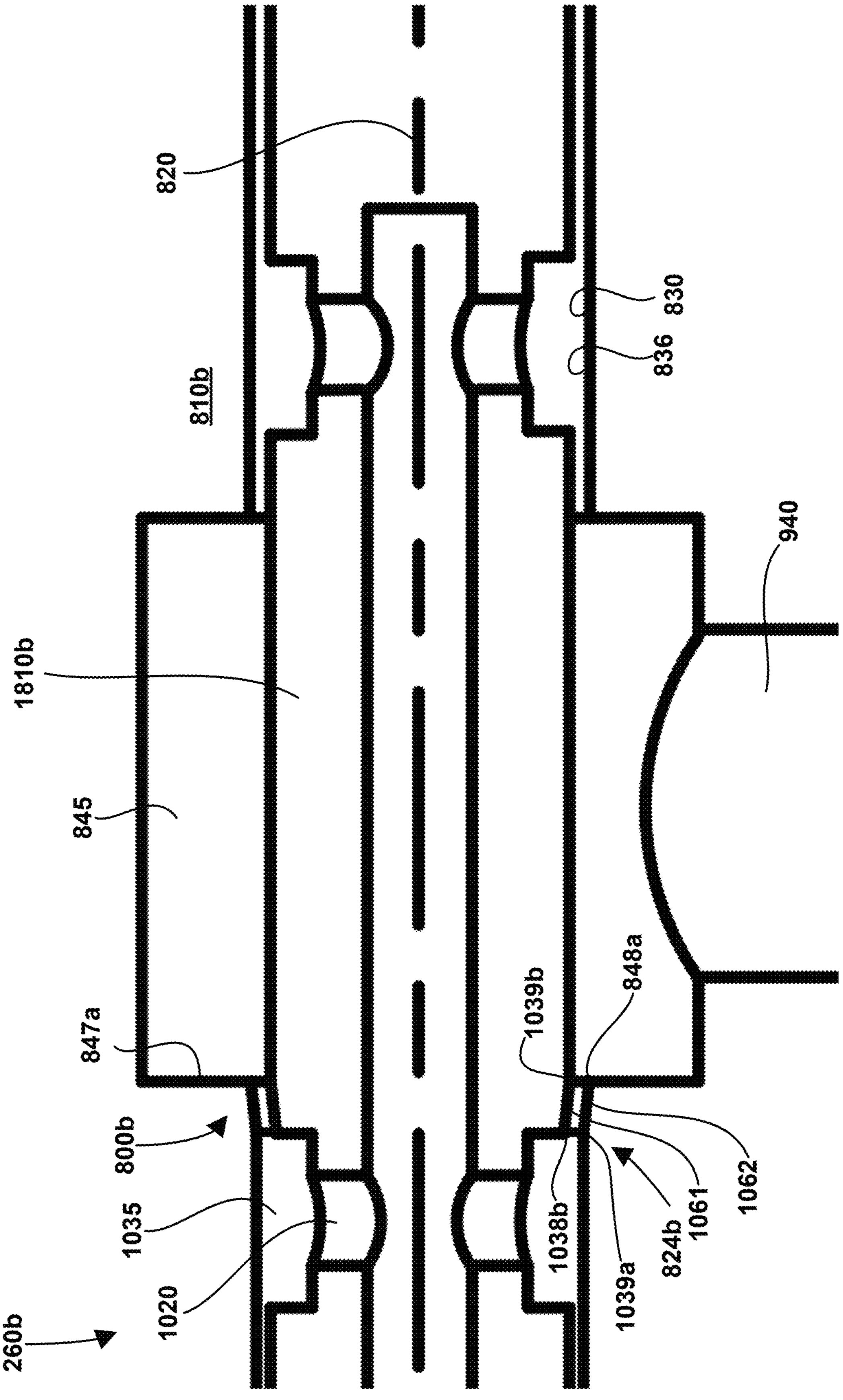
FIG. 19 is a schematic view of a liquid-fluid regulator according to another embodiment.

Referring to FIG. 19, a first feature that can reduce the rate of increase of the valve gain of regulating valve 800 as it is opened is now discussed. Match fit 824*b* between outer surface 1056 of valve member 1810*b* and bore wall 836 of regulator body 810*b* includes a tapered profile, at least for a portion of match fit 824*b*, whereby match fit 824*b* is a tapered match fit, such that as valve member 1810 moves to the right along axis 820 the flow area through match fit 824*b* increases. In the illustrated embodiment valve member 1810*b* includes annular tapered section 1061 that tapers radially outwardly with respect to axis 820 between edge 1038*b* and edge 1039*b*. Additionally, or alternatively, bore wall 836 can include annular tapered section 1062 that tapers radially outwardly with respect to axis 820 between edge 1039*a* and edge 848*a*. In other embodiments, the match fit 824*b* can include one of annular tapered section 1061 or annular tapered section 1062, but not both. The rate of increase of the valve gain is reduced by increasing the cross-sectional flow area through match fit 824*b* as valve member 1810*b* moves to the right in the illustrated embodiment towards the open position for regulating valve 800*b*. The first feature can be employed with all embodiments of regulating valve 800 disclosed herein.

Figure 20:
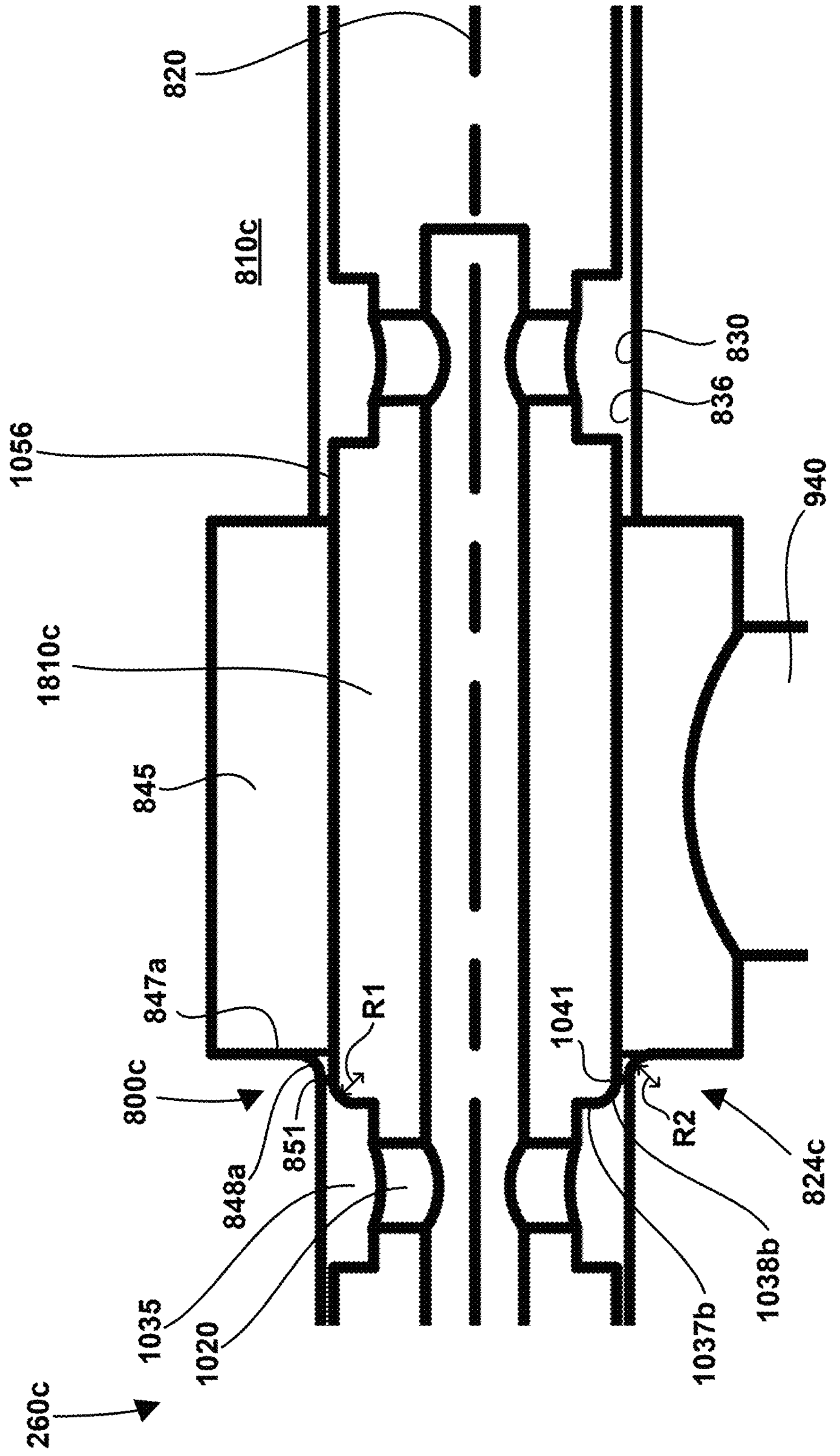
FIG. 20 is a schematic view of a liquid-fluid regulator according to another embodiment.

Referring to FIG. 20, a second feature that can reduce the rate of increase of the valve gain of regulating valve 800 as it is opened is now discussed. Edge 1038*b* can be defined by a fillet, a bevel, or a chamfer to introduce a gradual transition between outer surface 1056 and annular sidewall 1037*b* of valve member 1810*c*. In the illustrated embodiment, edge 1038*b* is a fillet, which can be defined as a rounded edge having a radius R1. The radius R1 of the fillet can be selected to adjust the rate of increase of the valve gain accordingly as valve member 1810*c* moves to the right as regulating valve 800*c* is opened. Additionally, or alternatively, edge 848*a* can be defined by a fillet, a bevel, or a chamber to introduce a gradual transition between bore wall 836 and annular sidewall 847*a*. In the illustrated embodiment, edge 848*a* is a fillet having a radius R2 selected to adjust the rate of increase of the valve gain as valve member 1810*c* moves to the right as regulating valve 800*c* is opened. In other embodiments of regulating valve 800*c,* either edge 1038*b* can be defined as a fillet, a bevel, or a chamfer, or edge 848*a* can be defined as a fillet, a bevel, or a chamfer, but not both. In the illustrated embodiment, the rate of increase of the valve gain is reduced by increasing the cross-sectional flow area through match fit 824*c,* where the cross-sectional flow area begins to increase through match fit 824*c* as leading portion 1041 of edge 1038*b* overlaps leading portion 851 of edge 848*a* as valve member 1810*c* moves to the right in the illustrated embodiment towards the open position for regulating valve 800*c*. The embodiments when either or both edges 1038*b* and 848*a* are bevels or chamfers are similar to those embodiments employing match fit 824*b* in FIG. 19 with either or both tapered sections 1061 and 1062. The second feature can be employed with all embodiments of regulating valve 800 disclosed herein.

Figure 21:
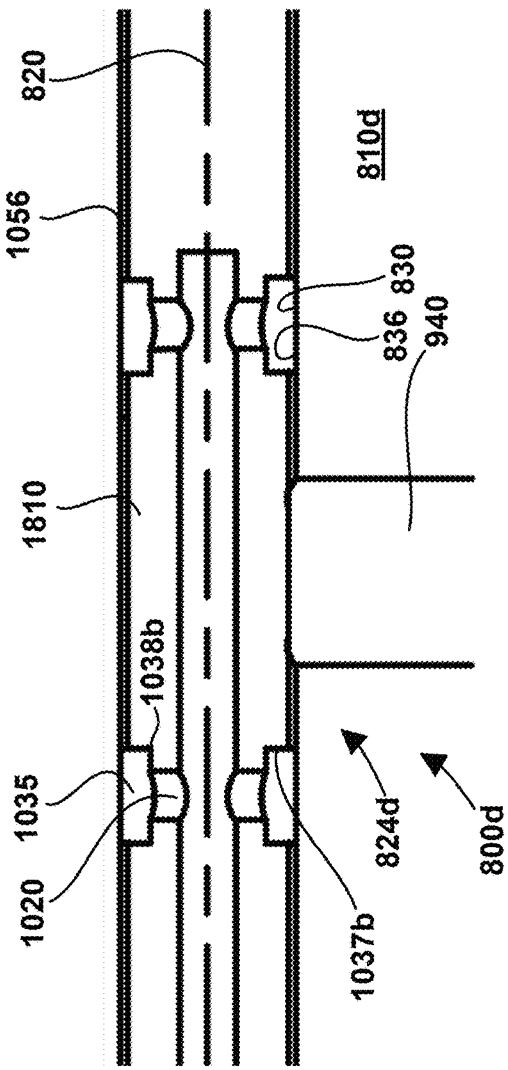
FIG. 21 is a schematic view of a liquid-fluid regulator according to another embodiment.
Figure 22:
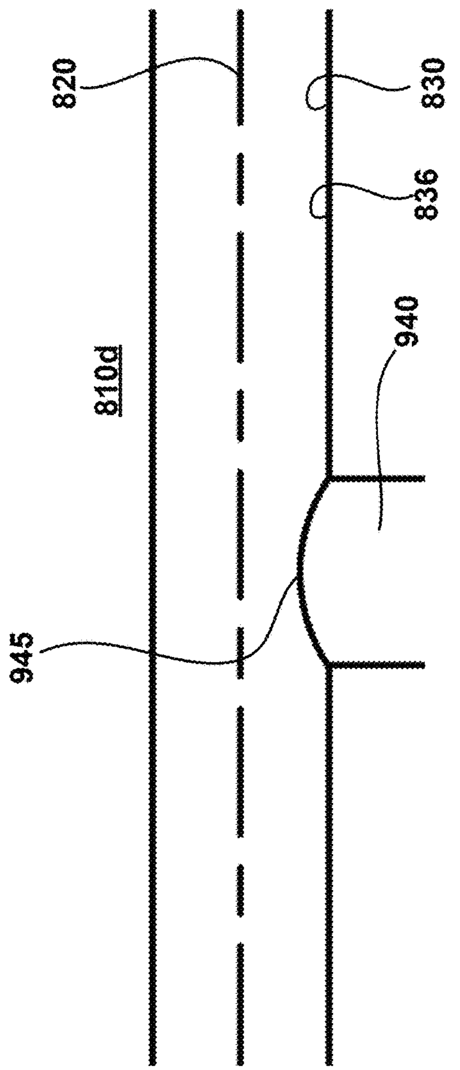
FIG. 22 is a schematic view of a valve member of the liquid-fluid regulator of FIG. 21.
Figure 23:
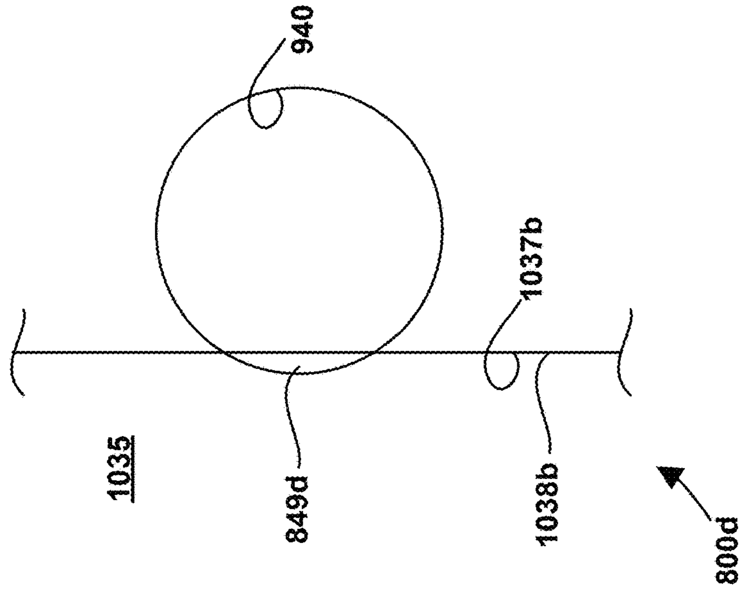
FIG. 23 is a schematic view of a regulating valve of the liquid-fluid regulator of FIG. 21 shown in an open position.
Figure 24:
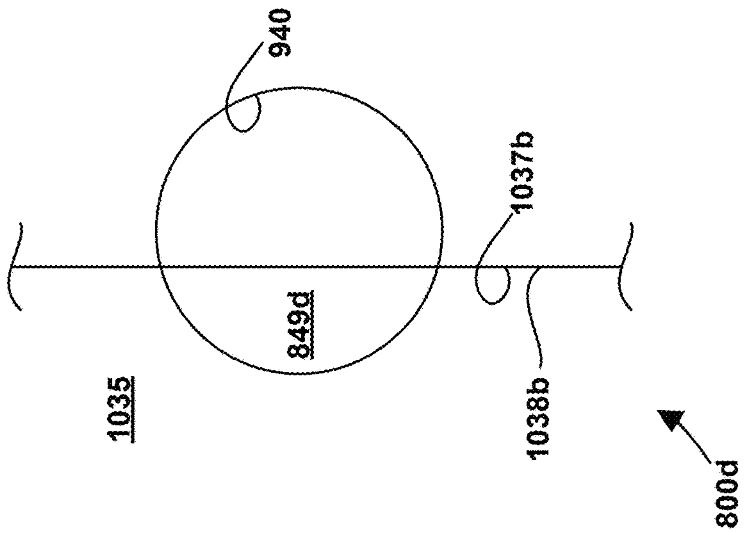
FIG. 24 is a schematic view of the regulating valve of the liquid-fluid regulator of FIG. 21 shown in a more open position than FIG. 23.
Figure 25:
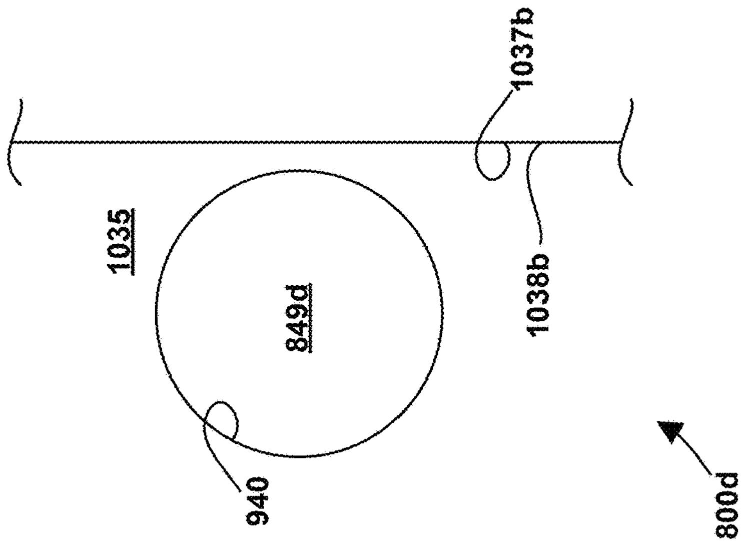
FIG. 25 is a schematic view of the regulating valve of the liquid-fluid regulator of FIG. 21 shown in a more open position than FIG. 24.

Referring now to FIGS. 21 and 22, a third feature that can reduce the rate of increase of the valve gain of regulating valve 800 as it is opened is now discussed. Outlet bore 940 extends directly to bore wall 836 (that is, annular groove 845 seen in FIG. 4*a* is eliminated) of regulator body 810*d* creating opening 945 in bore wall 836. In an exemplary embodiment outlet bore 940 is cylindrically shaped whereby opening 945 is also cylindrically shaped (at least a projection of opening 945 along a longitudinal axis of outlet bore 940 onto a plane at right angles to the longitudinal axis of outlet bore 940 is cylindrically shaped), although this is not a requirement. With further reference to FIG. 23, as valve member 1810 moves to the right in the illustrated embodiment regulating valve 800*d* opens when annular groove 1035 overlaps opening 945 creating opening surface 849*d* and the cross-sectional flow area through regulating valve 800*d* is constrained by opening surface 849*d.* Regulating valve 800*d* can be referred to as a hole valve. With still further reference to FIGS. 24 and 25, as valve member 1810 continues to move towards the right, annular groove 1035 overlaps increasingly more with opening 945 whereby the cross-sectional flow area through regulating valve 800*d* defined by opening surface 849*d* increases. A flow of liquid fluid through regulating valve 800*d* can be constrained by the size of outlet bore 940 or by other passages upstream of regulating valve 800*d* (such as bore 1020 seen in FIG. 21) as the cross-sectional flow area through opening surface 849*d* of regulating valve 800*d* increases beyond a limiting value depending upon the relative sizes of outlet bore 940 or other passages upstream of regulating valve 800*d.* In contrast, referring back to regulating valve 800 in FIGS. 7*a* and 7*b*, when regulating valve 800 is opened after match fit 824 disappears the cross-sectional flow area through the regulating valve is limited by the flow area through annular surface 849, which typically is larger than the cross-sectional flow area through opening surface 849*d* seen in FIGS. 23, 24, and 25 when regulating valve 800*d* is opened, such that the rate of increase of the valve gain for regulating valve 800*d* is less than the rate of increase of the valve gain for regulating valve 800. Additionally, or alternatively, in other embodiments annular groove 1035 can be eliminated and bore 1020 can extend directly to outer surface 1056 of valve member 1810, whereby regulating valve 800*d* opens when bore 1020 and outlet bore 940 overlap. The third feature can be employed with all embodiments of regulating valve 800 disclosed herein.

Figure 26:
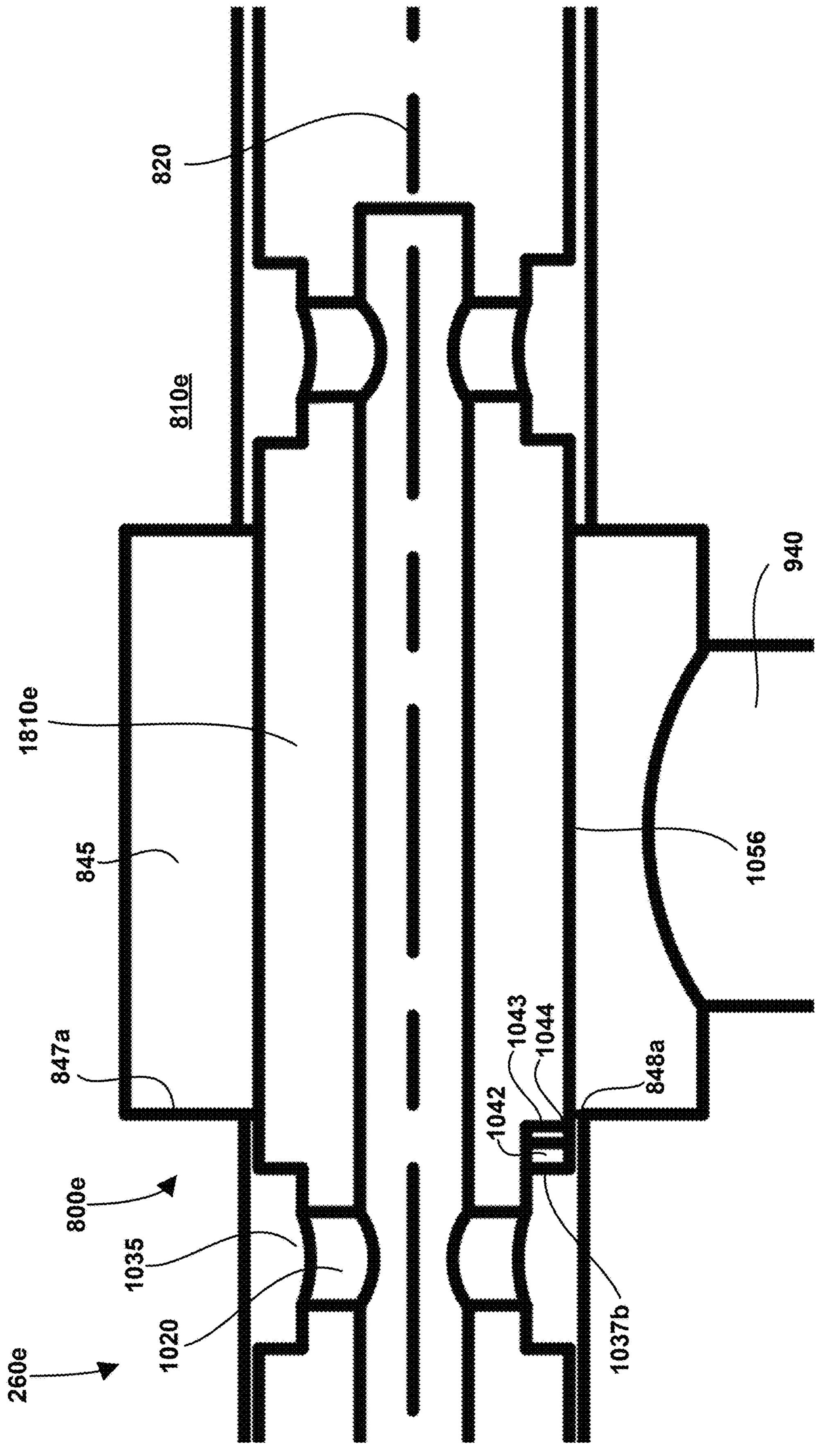
FIG. 26 is a schematic view of a liquid-fluid regulator according to another embodiment shown in a closed position.
Figure 27:
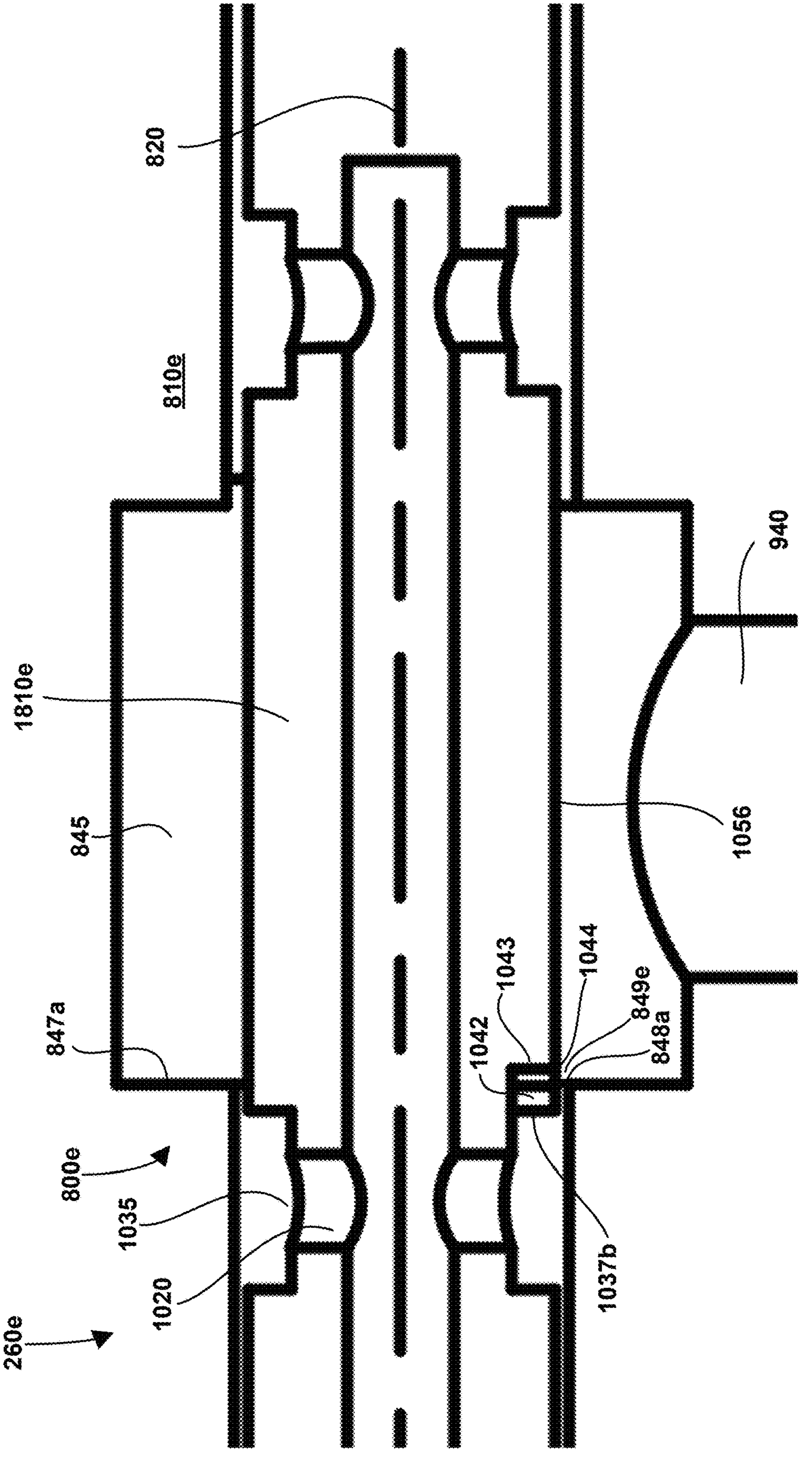
FIG. 27 is a schematic view of the liquid-fuel regulator of FIG. 26 shown in an open position.
Figure 28:
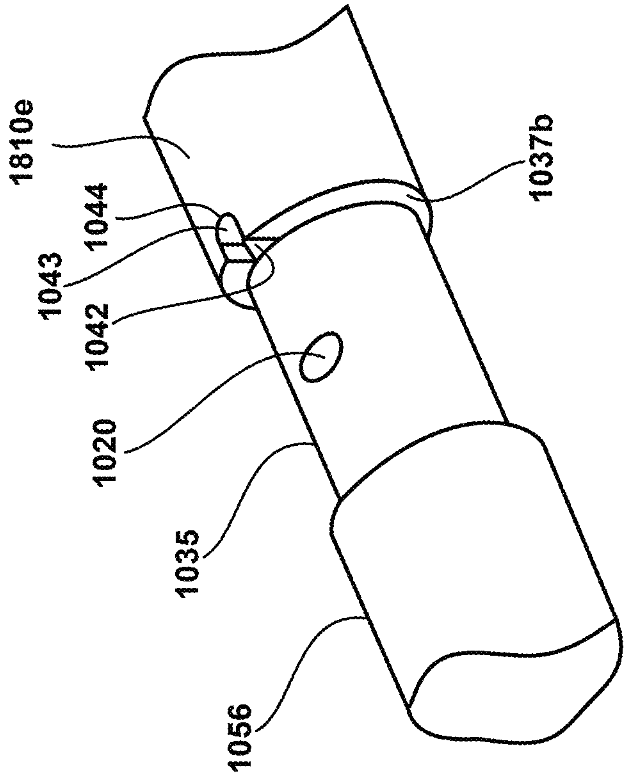
FIG. 28 is a perspective view of a valve member of the liquid-fuel regulator of FIGS. 26 and 27.

Referring now FIGS. 26, 27, and 28, a fourth feature that can reduce the rate of increase of the valve gain of regulating valve 800 as it is opened is now discussed. Valve member 1810*e* includes notch 1042 in annular sidewall 1037*b* that extends radially inwardly from outer surface 1056 and extends semi-annularly around a portion of annular sidewall 1037*b* with respect to axis 820. Regulating valve 800*e* opens as semi-annular sidewall 1043 of notch 1042 moves to the right of annular sidewall 847*a* of annular groove 845, defining semi-annular surface 849*e* (seen in FIG. 27) between edge 1044 of notch 1042 and edge 848*a* of annular groove 845. Before annular sidewall 1037*b* moves to the right of annular sidewall 847*a,* a cross-sectional flow area of semi-annular surface 849*e* is less than the value of the cross-sectional flow area of annular surface 849 seen in FIG. 7*b*, which effectively reduces the rate of increase of the valve gain of regulating valve 800*e* compared to the valve gain of regulating valve 800 as respective valves are opened. Although notch 1042 is illustrated as having a substantially square or rectangular shape this is not a requirement, and in other embodiments notch 1042 can have other shapes including one or more curved surface and/or one or more sloped surface, and semi-annular surface 849*e* generally constrains the cross-sectional flow area through notch 1042 into annular groove 845. Alternatively, or additionally, in other embodiments regulating valve 800*e* can include a notch in annular sidewall 847*a* of regulator body 810*e,* or more than one notch in annular sidewall 1037*b* and/or annular sidewall 847*a.* The fourth feature can be employed with all embodiments of regulating valve 800 disclosed herein. In still further embodiments, two or more of the first feature, the second feature, the third feature, and the fourth feature can be combined to reduce the rate of increase of the valve gain of regulating valve 800.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A pressure regulation system for a gaseous fluid comprising:

a gaseous fluid supply of the gaseous fluid;

a hydraulic fluid supply of a hydraulic fluid;

a rail injector in fluid communication with the gaseous fluid supply and the hydraulic fluid supply, the rail injector being hydraulically actuated with the hydraulic fluid;

a gaseous-fluid rail in fluid communication with the rail injector and in selective fluid communication with the gaseous fluid supply, the gaseous fluid having a gaseous-fluid rail pressure in the gaseous-fluid rail;

a pressure sensor in fluid communication with the gaseous-fluid rail and responsive to the gaseous-fluid rail pressure to emit signals representative of the gaseous-fluid rail pressure;

a controller communicatively configured with the pressure sensor and the rail injector and programmed to:

receive the signals representative of the gaseous-fluid rail pressure to determine a measured gaseous-fluid rail pressure; and actuate the rail injector to inject the gaseous fluid from the gaseous fluid supply into the gaseous-fluid rail as a function of the measured gaseous-fluid rail pressure.

2. The pressure regulation system of claim 1, wherein the gaseous fluid supply has a gaseous-fluid supply pressure and the hydraulic fluid supply has a hydraulic-fluid supply pressure, and the hydraulic-fluid supply pressure is less than the gaseous-fluid supply pressure.

3. The pressure regulation system of claim 1, wherein the rail injector is an outwardly opening injector.

4. The pressure regulation system of claim 1, the rail injector comprising an injector body and an injection valve, the injection valve having a valve seat and a valve member, the injector body including a bore formed therein in which the valve member reciprocates, a bore wall defining the bore has an annular groove therein extending around the valve member and said annular groove is in fluid communication with the hydraulic fluid supply, wherein the annular groove is in fluid communication with the gaseous-fluid rail through a match fit formed between an outer surface of the valve member and the bore wall when the injection valve is in an open position and in a closed position, and the annular groove is in fluid communication with the gaseous fluid supply through the match fit only when the injection valve is in the open position.

5. The pressure regulation system of claim 4, further comprising a hydraulic-fluid drain, the rail injector further comprising:

an opening control chamber in fluid communication with the hydraulic fluid supply;

a three-way valve in fluid communication with the hydraulic fluid supply and the hydraulic-fluid drain and communicatively connected with the controller;

a closing control chamber in fluid communication with the three-way valve;

wherein the controller is programmed to:

open the injection valve by commanding the three-way valve to fluidly connect the closing control chamber with the hydraulic-fluid drain; and close the injection valve by commanding the three-way valve to fluidly connect the closing control chamber with the hydraulic fluid supply.

6. The pressure regulation system of claim 5, further comprising a spring biasing the valve member towards the valve seat.

7. The pressure regulation system of claim 4, wherein the gaseous-fluid rail delivers the gaseous-fluid to a fuel consumer, the controller is further programmed to time opening of the injection valve as a function of a distance the fuel consumer is from the rail injector.

8. The pressure regulation system of claim 4, wherein the gaseous-fluid rail delivers the gaseous-fluid to a second injector having a second injection valve, the controller is further programmed to time opening of the injection valve such that a crest of a pressure wave associated with opening of the injection valve arrives at the second injection valve around a time when the second injection valve opens such that an injection pressure of the second injection valve is greater compared to if the crest of the pressure wave not arriving at the second injection valve.

9. The pressure regulation system of claim 1, the controller is further programmed to time opening of the injection valve such that a crest of a pressure wave associated with the opening of the injection valve arrives at the pressure sensor when the pressure sensor is generating signals associated with the gaseous-fluid rail pressure, and arrival of the crest of the pressure wave at the pressure sensor reduces fluctuations of the gaseous-fluid rail pressure around the pressure sensor such that the gaseous-fluid rail pressure is more representative of a mean gaseous-fluid rail pressure.

10. The pressure regulation system of claim 4, the controller is further programmed to time opening of the injection valve when pressure fluctuations in the gaseous-fluid rail result in a local pressure at the injection valve that is less than a mean gaseous-fluid rail pressure.

11. The pressure regulation system of claim 1, wherein the gaseous fluid is a gaseous fuel.

12. The pressure regulation system of claim 1, wherein the pressure regulation system is a dual-fluid pressure regulation system for regulating a differential pressure between a liquid fluid and the gaseous fluid, the pressure regulation system further comprising:

a liquid-fluid supply;

a liquid-fluid rail;

a liquid-fluid pump pumping the liquid fluid from the liquid-fluid supply into the liquid-fluid rail, the liquid fluid having a liquid-fluid rail pressure in the liquid-fluid rail;

a liquid-fluid drain in fluid communication with an upstream side of the liquid-fluid pump; and a liquid-fluid regulator responsive to the gaseous fluid in the gaseous-fluid rail to drain the liquid fluid from the liquid-fluid rail to the liquid-fluid drain such that the differential pressure between the liquid-fluid rail pressure and the gaseous-fluid rail pressure is within a predetermined range.

13. The pressure regulation system of claim 12, wherein the hydraulic fluid supply is the liquid-fluid rail and the hydraulic fluid is the liquid fluid.

14. The pressure regulation system of claim 12, wherein the liquid-fluid regulator is a dome-loaded regulator.

15. The pressure regulation system of claim 12, wherein the liquid-fluid drain is in fluid communication with the liquid-fluid supply.

16. The pressure regulation system of claim 12, wherein a dual-fluid injector is supplied gaseous fluid from the gaseous-fluid rail and liquid fluid from liquid-fluid rail.

17. The pressure regulation system of claim 16, wherein the liquid fluid is employed as the hydraulic fluid in the dual-fluid injector and the dual-fluid injector injects the gaseous fluid and the liquid fluid separately and independently from each other.

18. The pressure regulation system of claim 12, wherein the dual-fluid injector is a dual-fuel injector and the gaseous fluid is a gaseous fuel and the liquid fluid is a liquid fuel, and the gaseous-fluid rail is a gaseous-fuel rail and the liquid-fluid rail is a liquid-fuel rail.

19. The pressure regulation system of claim 18, wherein the liquid fuel is employed to ignite the gaseous fuel and/or the liquid fluid is selected from diesel, dimethyl ether, and liquified petroleum gas.

20. The pressure regulation system of claim 1, wherein the gaseous fluid is selected from methane, hydrogen, air, syngas, natural gas or mixtures thereof.

* * * * *